(12) United States Patent
Fuchikami et al.

(10) Patent No.: US 11,743,437 B2
(45) Date of Patent: *Aug. 29, 2023

(54) PROJECTION ADJUSTMENT PROGRAM AND PROJECTION ADJUSTMENT METHOD

(71) Applicant: PANASONIC INTELLECTUAL PROPERTY MANAGEMENT CO., LTD., Osaka (JP)

(72) Inventors: Ryuji Fuchikami, Fukuoka (JP); Ken Mashitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,924

(22) Filed: Jul. 14, 2022

(65) Prior Publication Data

US 2022/0360754 A1 Nov. 10, 2022

Related U.S. Application Data

(63) Continuation of application No. 17/055,763, filed as application No. PCT/JP2019/019408 on May 15, 2019, now Pat. No. 11,438,563.

(30) Foreign Application Priority Data

May 17, 2018 (JP) .............................. JP2018-095728

(51) Int. Cl.
*H04N 9/31* (2006.01)
*G06T 7/521* (2017.01)
(Continued)

(52) U.S. Cl.
CPC .......... *H04N 9/3194* (2013.01); *G06T 7/521* (2017.01); *G06T 7/73* (2017.01); *G06T 11/203* (2013.01);
(Continued)

(58) Field of Classification Search
None
See application file for complete search history.

(56) References Cited

U.S. PATENT DOCUMENTS

| 2014/0347497 A1 | 11/2014 | Fukuchi |
| 2015/0138240 A1 | 5/2015 | Hiranuma |

(Continued)

FOREIGN PATENT DOCUMENTS

| JP | 2005-258622 | 9/2005 |
| JP | 2013-192189 | 9/2013 |

(Continued)

OTHER PUBLICATIONS

International Search Report (ISR) from International Searching Authority (Japan Patent Office) in International Pat. Appl. No. PCT/JP2019/019408, dated Jul. 23, 2019, along with an English language translation thereof.

(Continued)

*Primary Examiner* — Samira Monshi
(74) *Attorney, Agent, or Firm* — Greenblum & Bernstein, P.L.C.

(57) ABSTRACT

A projection adjustment program which causes a computer to execute a process relating to adjustment of projection operations of a plurality of projection devices configured to perform position measurement and projection on a target object in a projection system including the plurality of projection devices. The process includes: causing a projection device to project measurement light onto the target object; causing an image capture device to receive reflection light of the measurement light, the reflection light being reflected from the target object; judging a connection relationship of a projection range of the projection device on a basis of the received reflection light of the measurement light; executing a process of the judging of the connection relationship on all processing target projection devices;

(Continued)

generating projection position information indicating a connection relationship between projection ranges of the respective projection devices of the projection system; and displaying the generated projection position information on a display.

4 Claims, 25 Drawing Sheets

(51) Int. Cl.
*G06T 7/73* (2017.01)
*G06T 11/20* (2006.01)

(52) U.S. Cl.
CPC ......... *H04N 9/3147* (2013.01); *H04N 9/3185* (2013.01); *G06T 2207/10028* (2013.01); *G06T 2207/10048* (2013.01)

(56) References Cited

U.S. PATENT DOCUMENTS

| | | |
|---|---|---|
| 2016/0088275 A1 | 3/2016 | Fuchikami |
| 2017/0223320 A1 | 8/2017 | Hiranuma |
| 2017/0318269 A1 | 11/2017 | Fukuchi |
| 2017/0347076 A1 | 11/2017 | Fuchikami et al. |

FOREIGN PATENT DOCUMENTS

| | | |
|---|---|---|
| JP | 2014-228617 | 12/2014 |
| JP | 2015-173431 | 10/2015 |
| JP | 2016-085435 | 5/2016 |
| JP | 2017-138581 | 8/2017 |
| JP | 2017-215374 | 12/2017 |
| WO | 2011/001507 | 1/2011 |

OTHER PUBLICATIONS

Written Opinion (WO) from International Searching Authority (Japan Patent Office) in International Pat. Appl. No. PCT/JP2019/019408, dated Jul. 23, 2019, along with an English language translation thereof.

Takei et al., "Development of a 3,000-fps 3D Imaging System Using a High-Speed Projector", Proceedings of the 2007 JSME Conference on Robotics and Mechatronics, May 10-12, 2007, pp. 1P1-M02(1) to 1P1-M02(4), The Japan Society of Mechanical Engineers, Akita, Japan.

PROJECTION ADJUSTMENT PROGRAM AND PROJECTION ADJUSTMENT METHOD

CROSS-REFERENCE TO RELATED APPLICATIONS

This is a continuation of U.S. patent application Ser. No. 17/055,763, filed Nov. 16, 2020, which is a National Stage Entry of International Pat. Appl. No. PCT/JP2019/019408, filed May 15, 2019, which claims the benefit of priority of Japanese Pat. Appl. No. 2018-095728, filed May 17, 2018. The entire disclosure of each of the above-identified documents is incorporated herein by reference in its entirety.

TECHNICAL FIELD

The present disclosure relates to a projection adjustment program and a projection adjustment method used in a projection system for projecting a video onto a target object.

BACKGROUND ART

A technology for projecting a video onto a target object such as a screen or a construction, a technology called "projection mapping," is known. Among projection mapping systems are systems having an image capture function. For example, Patent Literature 1 discloses a system capable of acquiring a 3D shape of a subject and capturing an image of the subject with visible light at the same time.

Various projection systems using a plurality of projection devices have been proposed for purposes of large-screen display etc. Among projection systems of this kind are a multi-projection system which performs large-screen display by arranging a plurality of projection devices in the horizontal direction and the vertical direction and displaying projected pictures of the respective projection devices side by side and a stack projection system which increases the brightness of a projected picture by displaying projected pictures of respective devices in a superimposed manner. For example, Patent Literature 2 discloses a system which makes it possible to manipulate each projector easily or to manipulate all projectors together easily by performing an infrared communication between the plurality of projectors.

CITATION LIST

Patent Literature

Patent Literature 1: JP-A-2005-258622
Patent Literature 2: WO 2011/001507 A1

SUMMARY OF INVENTION

Technical Problem

An object of the present disclosure is to provide a projection adjustment program and a projection adjustment method which allow, in arranging a plurality of projection devices, a user to easily recognize a positional relationship between a plurality of projection ranges.

The disclosure provides a projection adjustment program which causes a computer to execute a process relating to adjustment of projection operations of a plurality of projection devices configured to perform position measurement and projection on a target object in a projection system including the plurality of projection devices, the process including: causing a first projection device of the projection system to project invisible measurement light onto the target object; causing a second projection device of the projection system to receive reflection light of the measurement light, the reflection light being reflected from the target object; judging a connection relationship of a projection range of the first projection device on the basis of the received reflection light of the measurement light; executing a process of the judging of the connection relationship on all processing target projection devices; and generating projection position information indicating a connection relationship between projection ranges of the respective projection devices of the projection system and displaying the projection position information on a display unit.

The disclosure also provides a projection adjustment method of a projection adjustment device configured to execute a process relating to adjustment of projection operations of the plurality of projection devices configured to perform position measurement and projection on a target object in a projection system including the plurality of projection devices, the projection adjustment method including: causing a first projection device of the projection system to project invisible measurement light onto the target object; causing a second projection device of the projection system to receive reflection light, reflected from the target object, of the measurement light; judging a connection relationship of a projection range of the first projection device on the basis of the received reflection light of the measurement light; executing the connection relationship judging step on all processing target projection devices; and generating projection position information indicating a connection relationship between the projection ranges of the respective projection devices of the projection system and displaying the generated projection position information on a display unit.

ADVANTAGEOUS EFFECTS OF INVENTION

The disclosure makes it possible to allow, in arranging a plurality of projection devices, a user to easily recognize a positional relationship between a plurality of projection ranges.

DESCRIPTION OF EMBODIMENTS

Introduction to Content of Embodiment

Figure 1:
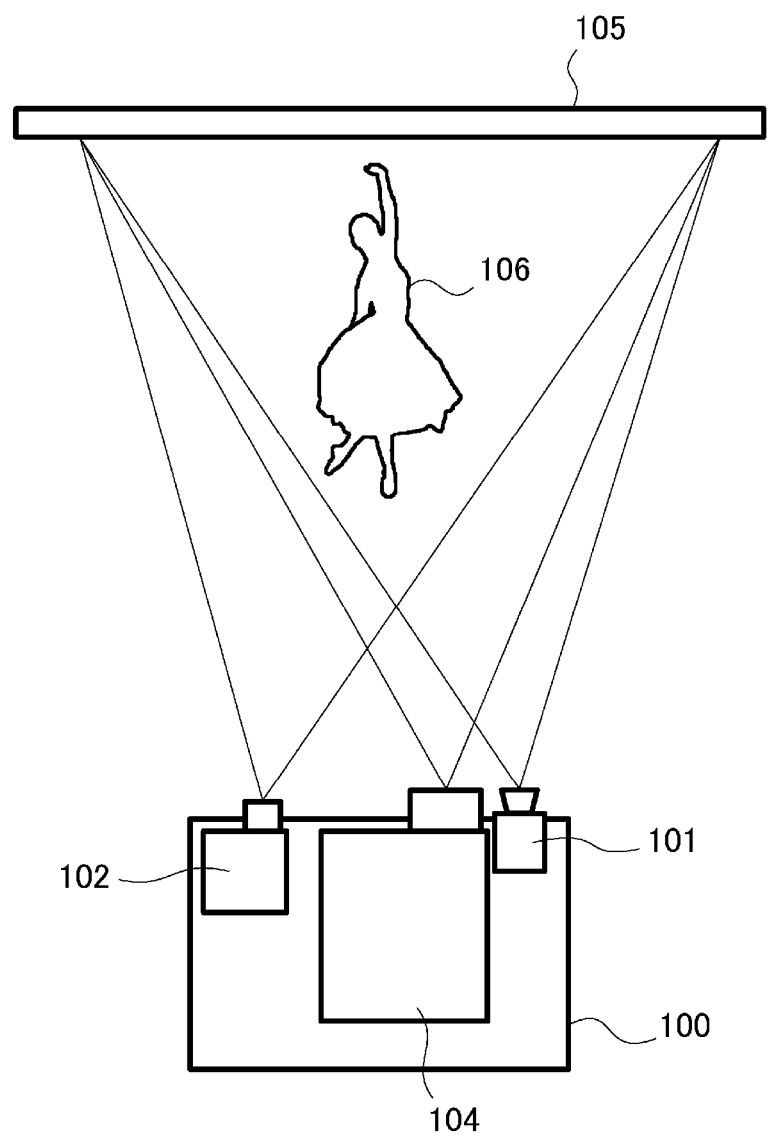
FIG. 1 is a diagram for outlining of the configuration and function of a measuring projection device according to an embodiment.

In projecting a video content onto a projection target in, for example, projection mapping, it is required to project the video content on the projection target by positioning the former with respect to the latter in an intended manner. Finally, it is necessary to obtain geometrical positional information of a target object in the coordinate system of a projection device.

To perform a projection onto a static target object, it suffices to perform a measurement only once before the projection. In this case, interference between the projection and the measurement can be disregarded. On the other hand, consider a case of performing an errorless projection in real time on the basis of a result of a 3D measurement that is performed concurrently on a target object moving and/or deforming dynamically. In this case, it is required to perform a measurement so as not to affect a video content being projected.

However, the above-mentioned Patent Literature 1 merely discloses that projection of a pattern image for 3D measurement with invisible light makes it possible to perform a measurement without being affected by visible light emitted from a visible light source installed at another place. Only a measurement result in a coordinate system that is similar to the coordinate system of an image capture device is obtained by the technique of Patent Literature 1.

In the field of measurement, systems disclosed in Referential Non-Patent Literature 1 and Referential Patent Literature 3, for example, are known in addition to the system disclosed in the above-mentioned Patent Literature 1.

Referential Patent Literature 3: JP-A-2013-192189

Referential Non-Patent Literature 1: "Development of a 3,000-fps 3D Imaging System Using a High-Speed Projector," Proceedings of the JSME Conference on Robotics and Mechatronics 2007, "1P1-M_02(1)"-"1P1-M02(4)," May 11, 2007

Referential Non-Patent Literature 1 discloses a technique for measuring a 3D shape at high speed using optical pattern projection. A measuring system of Referential Non-Patent Literature 1 is equipped with an image capture device and a projection device having a light source, a lens, and a mirror element or liquid crystal element. The image capture device has a function of performing high-speed imaging. For example, the image capture device can perform high-speed imaging at 6,000 fps. The projection device can project binary patterns having 1,024×768 pixels at a rate of 6,000 fps or more.

Referential Patent Literature 3 discloses a measuring system which adjusts a video content on the basis of data taken by imaging. The measuring system of Referential Patent Literature 3 is equipped with an image capture device, a projection device, and a computing device. The computing device performs image recognition on a projection target on the basis of an imaging result of the image capture device. The computing device generates a video of a video content so that the video content is projected in an area obtained by recognizing the projection target. The projection device projects the video content onto the projection target.

The above Referential Non-Patent Literature 1 merely discloses the technical level for performing a 3D measurement at high speed. Conventionally, high-speed 3D measurement of a moving object is difficult because sending of coordinates information of a moving object requires images several tens of frames. The technique of Referential Non-Patent Literature 1 is meaningful in that it suggests that a high-speed measurement is possible.

However, Referential Non-Patent Literature 1 merely discloses a sole 3D measurement technique and refers to nothing about the coordinate system of the projection device. Referential Non-Patent Literature 1 refers to offline processing performed after high-speed imaging, that is, non-real-time processing. In the first place, in computer architecture devices such as personal computers having, as an assumption, image processing at, for example, 60 Hz, a delay of several tens of milliseconds or more occurs at the input and output. As a result, it is difficult to shoot a moving object while projecting its video onto it and feed back a result of the imaging to the projection.

In the technique of the above Referential Patent Literature 3, the difference between the positions of the image capture device and the projection device causes a parallax. However, Referential Patent Literature 3 has no disclosure about how to solve the parallax problem or increase the operation speed of the system In view of the above circumstances, the present inventors have conceived a projection system which is equipped with an invisible light projection device capable of high-speed projection of invisible light such as infrared light, a visible light projection device capable of high-speed projection of visible light, and an image capture device capable of high-speed imaging and which can measure a position of a target object with high accuracy by performing, at high speed, projection of measurement light using invisible pattern light and imaging with it and project a visible light video content onto the target object while positioning it in an intended manner.

Now assume a projection system in which a plurality of projection devices are arranged that performs position measurement of a target object by projecting measurement light onto it at high speed. Such a projection system is required to adjust projection times and projection ranges of the plurality of projection devices and to make it possible to perform position measurement and video projection on a target object with high accuracy. The above Patent Literature 2 merely discloses how to enable detection of presence of another projection device and manipulation of a plurality of projection devices by performing infrared light communications between the plurality of projection devices.

The above projection system which performs position measurement and video projection using a plurality of projection devices has a problem that where projection ranges of the plurality of projection devices overlap with each other, measurement light beams interfere with each other in the overlap regions, disabling a proper position measurement.

Furthermore, where a plurality of projection devices capable of high-accuracy position measurement are provided, a problem arises that a positional relationship between a plurality of projection ranges of the respective projection devices such as an arrangement of the projection ranges and overlaps between the projection ranges cannot be recognized easily.

Each embodiment as a specific disclosure of a configuration according to the present disclosure will be described in detail by referring to the drawings when necessary. However, unnecessarily detailed descriptions may be avoided. For example, detailed descriptions of already well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure thoroughly and are not intended to restrict the subject matter set forth in the claims.

EMBODIMENT

First, a description will be made of a projection system, projection device, and projection method according to an embodiment that enable proper position measurement by preventing interference between measurement light beams by controlling the timing relationship between projection times of invisible light beams for position measurement in a plurality of projection devices.

(Outlines of Measuring Projection Device and Projection System)

FIG. 1 is a diagram for outlining of the configuration and function of a measuring projection device according to the embodiment. The embodiment is directed to a case of measuring positions of target objects and projecting a video according to position information of the target objects using a measuring projection device 100 shown in FIG. 1 which is a projection device for projecting a video onto the target objects. Assumed here as the target objects are a first target object 105 such as a flat screen, a curved screen, or a wall surface and a second target object 106 such as a person located in front of the first target object 105. They may be referred to below simply as target objects 105 and 106. It is assumed that the second target object 106 such as a person moves as a whole while moving parts of his or her body by, for example, dancing in front of the first target object 105 such as a screen. That is, the shape and the position of each part of the target object 106 vary according to its motion. Thus, to project a prescribed video content onto the target objects 105 and 106, it is necessary to measure a position of the second target object 106 with respect to the first target object 105 and to acquire accurate position information of the target object 106.

The measuring projection device 100 is equipped with an image capture device 101 which is an example light receiving unit, an infrared light projection device 102 which is an example invisible light projection unit for projecting infrared light as example invisible measurement light, and a visible light projection device 104 which is an example visible light projection unit for projecting visible light. The measuring projection device 100 measures positions of the target objects 105 and 106 at high speed by projecting, at high speed, infrared pattern light in which sets of projection coordinates have been coded by the infrared light projection device 102 and capturing images of the target objects 105 and 106 at high speed by the image capture device 101. The details of the position measurement of the target objects will be described later. Then the measuring projection device 100 projects a prescribed video by the visible light projection device 104 on the basis of position information of the target objects 105 and 106 particularly in a state that it is always positioned with respect to the moving target object 106. In the embodiment, it is assumed that as described later a projection system is constructed by arranging a plurality of measuring projection devices 100 as appropriate.

Figure 2:
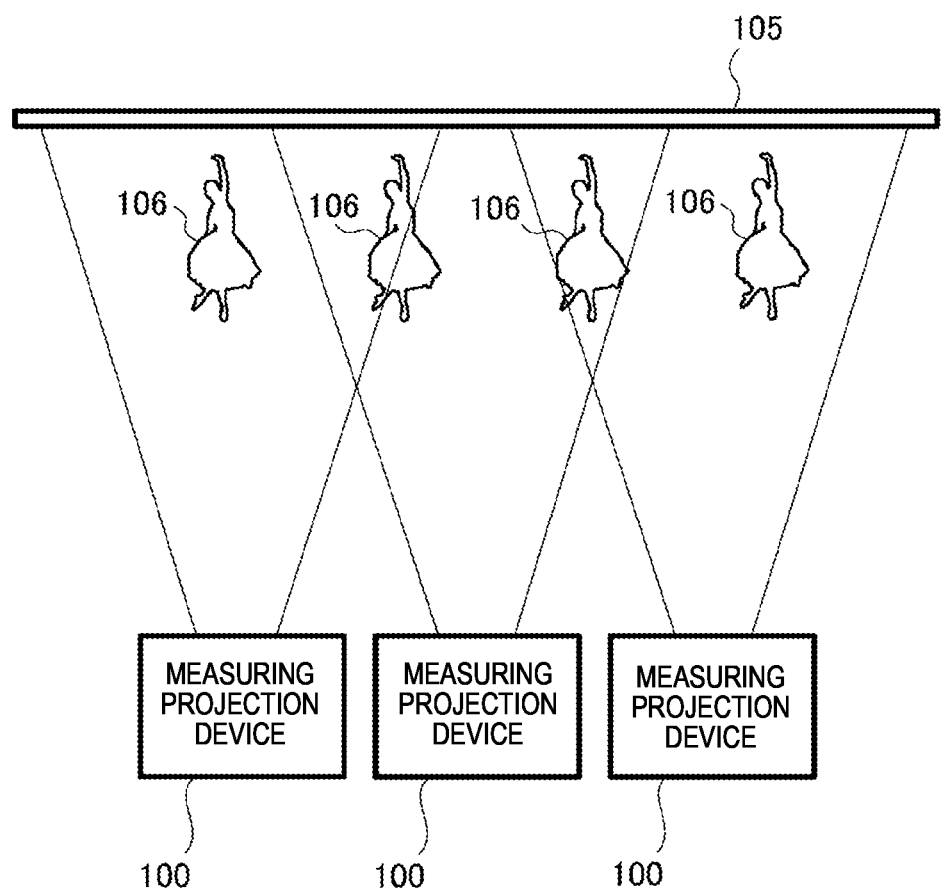
FIG. 2 is a diagram showing a first example use of a projection system according to the embodiment.

Several example uses of a projection system using a plurality of measuring projection devices 100 will now be described. FIG. 2 is a diagram showing a first example use of a projection system according to the embodiment. The first example use is an example in which a plurality of (in the illustrate example, three) measuring projection devices 100 are arranged side by side and position measurement and video projection are performed by multi-plane projection onto target objects 105 and 106 by setting the projection ranges of the respective measuring projection devices 100 so that they overlap with each other and cover a wide area. In this case, a problem may occur that positions of the target objects 106 cannot be measured accurately due to interference between measurement light beams in the overlap regions of the projection ranges.

Figure 3:
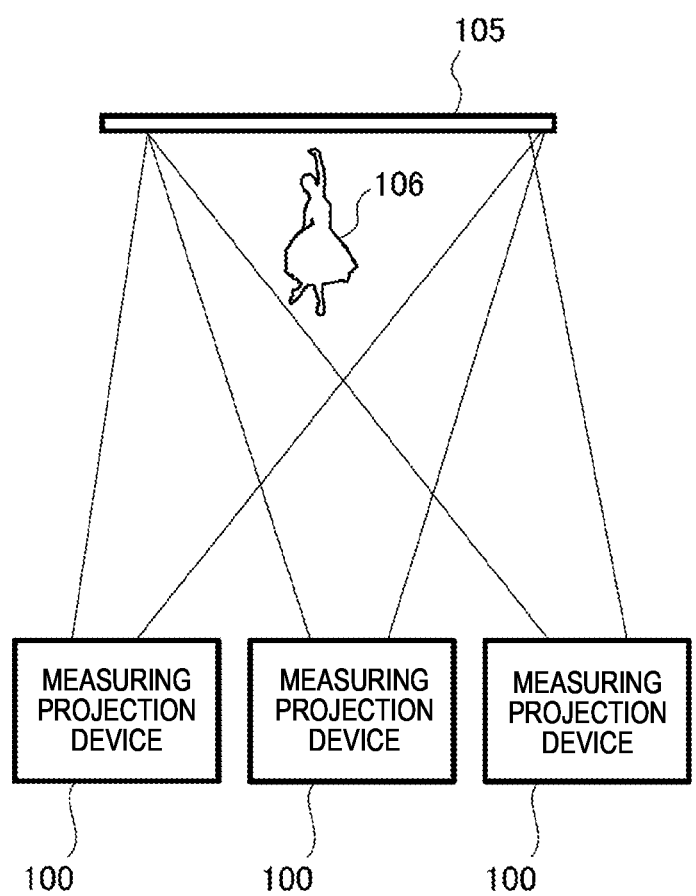
FIG. 3 is a diagram showing a second example use of a projection system according to the embodiment.

FIG. 3 is a diagram showing a second example use of a projection system according to the embodiment. The second example use is an example in which a plurality of (in the illustrate example, three) measuring projection devices 100 are arranged side by side and position measurement and video projection are performed outdoors, for example, by stack projection onto target objects 105 and 106 by setting the projection ranges of the respective measuring projection devices 100 in such a manner that they are superimposed on each other fully or almost fully to attain high-luminance projection. In this case, the projection angles of the respective measuring projection devices 100 with respect to the target objects 105 and 106 are different from each other and interference occurs between measurement light beams in most of the projection area of the measurement light beams where the projection ranges are superimposed on each other: a problem may occur that positions of the target object 106 cannot be measured accurately.

Figure 4:
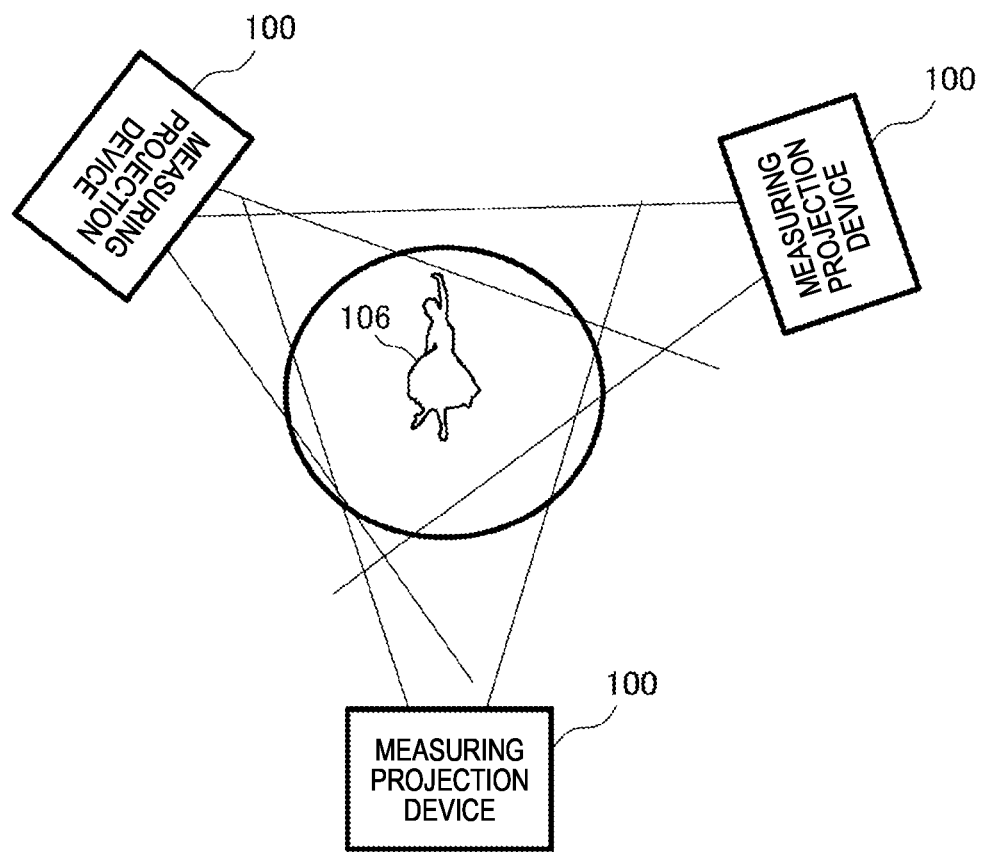
FIG. 4 is a diagram showing a third example use of a projection system according to the embodiment.

FIG. 4 is a diagram showing a third example use of a projection system according to the embodiment. The third example use is an example in which a plurality of (in the illustrate example, three) measuring projection devices 100 are arranged on a circle so as to surround a target object 106 and position measurement and video projection are performed on the target object 106 from the plurality of measuring projection devices 100 by wrapping projection (360° video projection) onto a target object 106 so that the three-dimensional object can be seen from many angles. In this case, since the projection ranges of the respective measuring projection devices 100 are superimposed on each other largely, a problem may occur that the position of the target 106 cannot be measured accurately due to interference between measurement light beams.

In the embodiment, the above problems are solved by preventing interference between measurement light beams by controlling an emission timing relationship between measurement light beams of the plurality of measuring projection devices 100 by a timing control unit.

Figure 5:
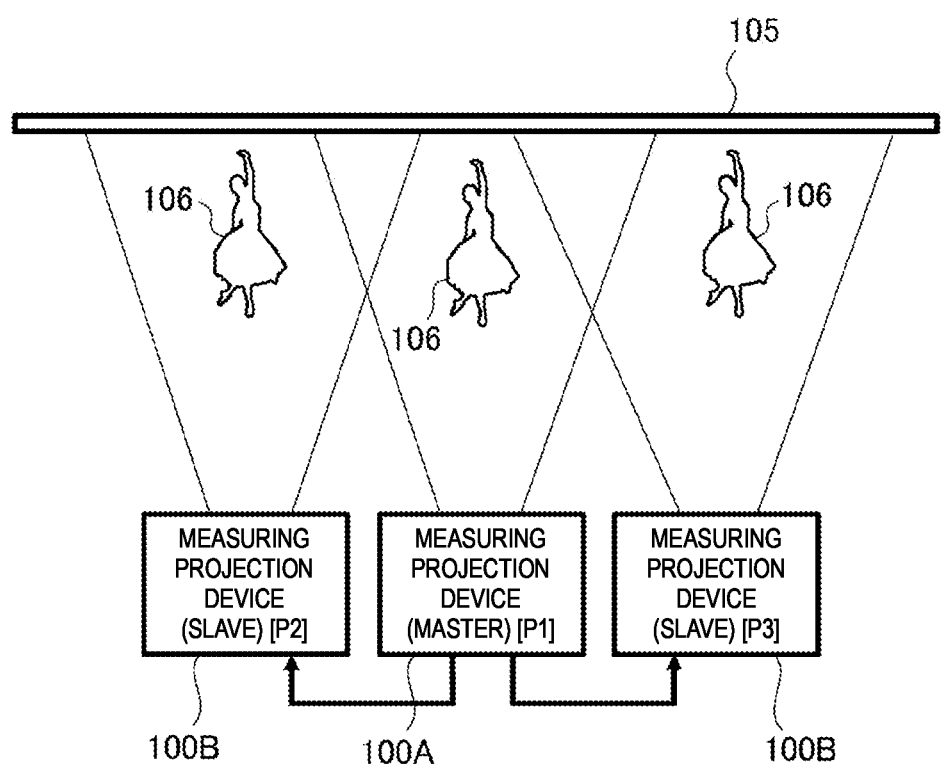
FIG. 5 is a diagram showing a first example configuration of a projection system according to the embodiment.

FIG. 5 is a diagram showing a first example configuration of a projection system according to the embodiment. The projection system of the first example is equipped with a plurality of measuring projection devices 100A and 100B and performs position measurement and video projection on target objects 105 and 106 by the measuring projection devices 100A and 100B. In the first example, the plurality of measuring projection devices 100A and 100B are connected to each other and the first measuring projection device 100A functions as a master and the other, second measuring projection devices 100B function as slaves. Having a timing control unit inside, the master measuring projection device 100 takes synchronization by instructing the slave measuring projection devices 100B on operation timings and thereby controls the timing relationship between position measurement and video projection operations of the respective measuring projection devices of the projection system. The configuration of the illustrated example has the three measuring projection devices: the central device is a master measuring projection device P1, the left-hand device is a slave measuring projection device P2, and the right-hand device is a slave measuring projection device P3.

Figure 6:
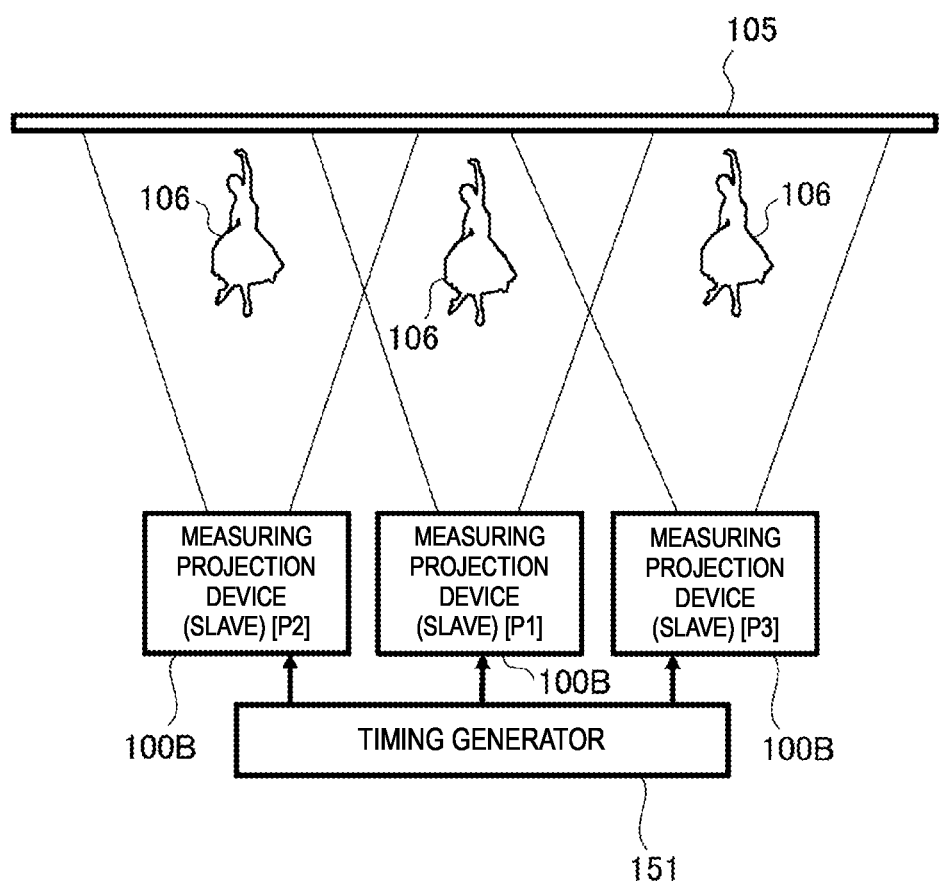
FIG. 6 is a diagram showing a second example configuration of a projection system according to the embodiment.

FIG. 6 is a diagram showing a second example configuration of a projection system according to the embodiment. The projection system of the second example is equipped with slave measuring projection devices 100B as a plurality of measuring projection devices and performs position measurement and video projection on target objects 105 and 106 by these measuring projection devices 100B. In the second example configuration, a timing generator 151 is provided outside as an example timing control unit and the plurality of slave measuring projection devices 100B are connected to the timing generator 151. Constituted by a computer or the like provided outside, the timing generator 151 synchronizes the plurality of slave measuring projection devices 100B by instructing them on operation timings and thereby controls the timing relationship between position measurement and video projection operations of the respective measuring projection devices of the projection system. The configuration of the illustrated example has the three measuring projection devices and all of a central measuring projection device P1, a left-hand measuring projection device P2, and a right-hand measuring projection device P3 function as slaves.

(Configuration of Measuring Projection Device)

Next, an example configuration and operation of a measuring projection device will be described in more detail.

Figure 7:
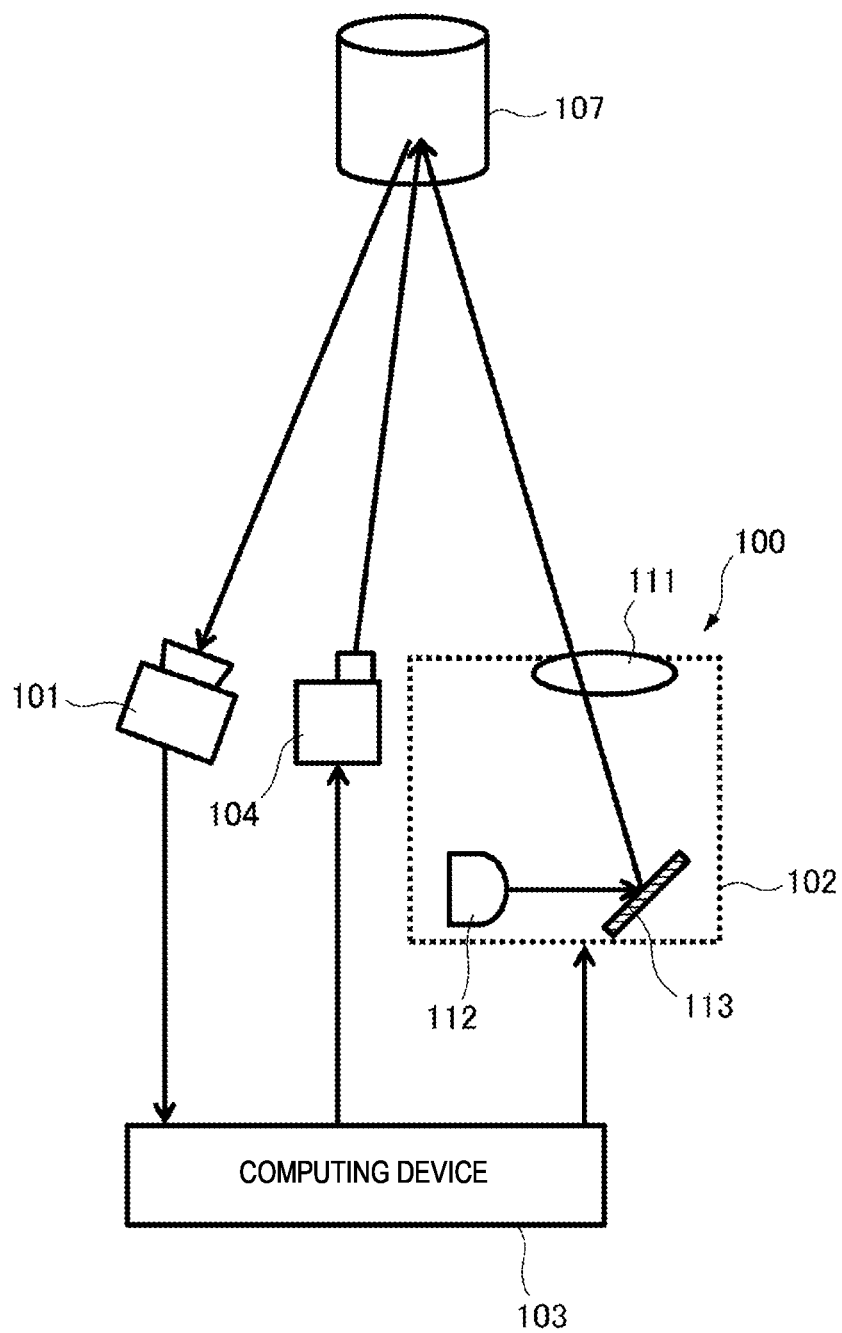
FIG. 7 is a diagram showing a rough configuration of a measuring projection device according to the embodiment.

FIG. 7 is a diagram showing a rough configuration of a measuring projection device according to the embodiment. The measuring projection device 100 includes an image capture device 101, an infrared light projection device 102, a visible light projection device 104, and a computing device 103.

In the embodiment, as in Referential Non-Patent Literature 1, the image capture device 101 can perform imaging at 6,000 frames/sec. Having a large-scale transfer bandwidth inside with no buffering, the image capture device 101 can output data taken to the computing device 103. Furthermore, the image capture device 101 is sensitive in an infrared range. Based on these assumptions, an example function and operation of each device will be described below.

The infrared light projection device 102, which is an example invisible light projection unit, projects pattern light (example measurement light) representing a pattern image in which sets of projection coordinates in a projection coordinate system are coded. In this specification, the term "projection coordinate system" means a coordinate system in which to specify coordinates of each pixel of a video content image as a projection image to be projected by the visible light projection device 104. Coordinates that determine each pixel of a video content image are referred to as "projection coordinates" in the projection coordinate system. Projection coordinates also correspond to coordinates of each pixel of a pattern image to be projected by the infrared light projection device 102.

The infrared light projection device 102 is equipped with a lens optical system 111, an infrared LED light source 112, and a display device 113. The lens optical system 111 may either be a single lens or consist of a plurality of lenses (lens group). For example, the plurality of lenses may include a zoom lens, a focusing lens, etc.

The infrared LED light source 112 emits infrared light (example invisible light) in the form of pattern light. For example, the invisible light has wavelengths in an infrared range (approximately 700 to 1,000 nm). Although in the embodiment the infrared LED light source is employed as a light source of invisible light, a light source that emits ultraviolet light can also be used.

The display device 113 is, for example, a device in which micromirrors are arranged on 1,024×768 squares, respectively, and generates a pattern image obtained by coding sets of projection coordinates. The display device 113 can output a video at 30,000 frames/sec in the form of binary patterns. Instead of the reflection-type optical element, the display device 113 may be either a transmission-type optical element or a liquid crystal device.

The image capture device 101, which is an example light-receiving unit, generates an image taken of pattern light by capturing a pattern light image. The image capture device 101 includes an image sensor, a lens optical system, etc. For example, an image sensor having 1,024×768 pixels may be used so as to correspond to the display device 113. In this case, if each pixel has a resolution of 8 bits, the transfer bandwidth is about 38 Gbps. It is assumed here that the computing device 103 is implemented as, for example, an FPGA (field-programmable gate array). Taking the current levels of the semiconductor technologies, into consideration, the transfer bandwidth of about 38 Gbps is well in a realizable range.

The image capture device 101 has an imaging coordinate system. In this specification, the term "imaging coordinate system" means a coordinate system in which to specify coordinates of each pixel of an image taken by the image capture device 101. The coordinates of each pixel of an image taken are referred to as "imaging coordinates" to discriminate them from "projection coordinates."

The visible light projection device 104, which is an example visible light projection unit, projects video light representing a video content. The visible light projection device 104 is equipped with a lens optical system, a visible light source, and a display device that is similar to the one employed in the infrared light projection device 102. The visible light projection device 104 emits, as video light, light in a visible range (approximately 380 to 780 nm). From the viewpoint of simplification, the visible light source can be a monochrome visible LED light source. Alternatively, the visible light projection device 104 may naturally project a full-color video by employing three light sources of red, blue, and green three colors. If a color wheel capable of rotating at a sufficiently high speed is available, a full-color video can be projected by employing a white light source such as a high-pressure mercury lamp in place of the visible LED light source and attaching the color wheel to it on its output side. As a further alternative, a light source in which light beams having respective wavelengths can be extracted from light emitted from a high-pressure mercury lamp by a dichroic prism or the like can be employed as the visible light source. In these manners, every light source can be employed in this disclosure.

The computing device 103, which is an example computing unit, decodes an image taken into projection coordinates information representing sets of projection coordinates corresponding to sets of imaging coordinates in the imaging coordinate system, converts the projection coordinates information into distance information to a target object using the projection coordinate system as a reference, and determines the details of a video content selectively according to the distance information.

Figure 8:
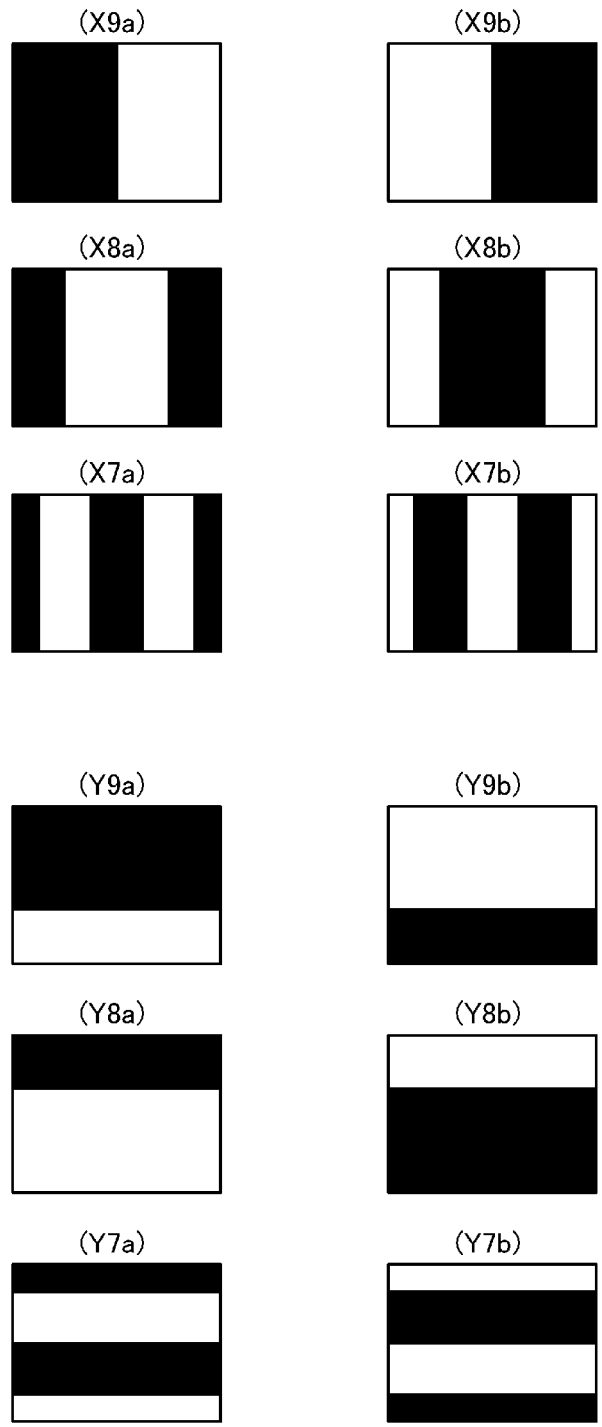
FIG. 8 shows example invisible light measurement patterns in the embodiment.

FIG. 8 shows example invisible light measurement patterns employed in the embodiment. FIG. 8 exemplifies part of coded pattern images (coordinate patterns) corresponding to pattern light. The pattern images shown in FIG. 8 are obtained by Gray-coding X coordinates and Y coordinates of the respective mirrors of the display device 113 having 1,024×768 micromirrors and expressing a coding result as a black-and-white binary image (bit-by-bit processing).

The infrared light projection device 102 can project pattern light onto a target object 107 (corresponding to target objects 105 and 106) on the basis of a pattern image of 1,024×768 pixels, for example. The X coordinates and the Y coordinates of pixels are both larger than 512 and smaller than or equal to 1,024. In this case, bit 0 to bit 9 (10 bits) of each X coordinate are Gray-coded. As in each X coordinate, bit 0 to bit 9 (10 bits) of each Y coordinate are Gray-coded. Coordinates information can be coded by assigning a total of 20 bits to each set of coordinates (10 bits to each of X and Y coordinates). An example in which 20-bit information of image data of 40 frames is coded will be described below.

In FIG. 8, (X9a) denotes a pattern image corresponding to bit 9 after Gray coding of X coordinates. In the embodiment, since projection coordinates are coded by Manchester coding, an inverted pattern image in which bit 9 is bit-inverted is also used. In FIG. 8, (X9b) denotes an inverted pattern image obtained by bit-inverting the image pattern (X9a). Likewise, in FIG. 8, (X8a) denotes a pattern image corresponding to bit 8 after Gray coding of X coordinates and (X8b) denotes an inverted pattern image obtained by inverting the image pattern (X8a). In FIG. 8, (X7a) denotes a pattern image corresponding to bit 7 after Gray coding of X coordinates and (X7b) denotes an inverted pattern image obtained by inverting the image pattern (X7a).

In FIG. 8, (Y9a) denotes a pattern image corresponding to bit 9 after Gray coding of Y coordinates. In FIG. 8, (Y9b) denotes an inverted pattern image obtained by inverting the image pattern (Y9a). Likewise, in FIG. 8, (Y8a) denotes a pattern image corresponding to bit 8 after Gray coding of Y coordinates and (Y8b) denotes an inverted pattern image obtained by inverting the image pattern (Y8a). In FIG. 8, (Y7a) denotes a pattern image corresponding to bit 7 after Gray coding of Y coordinates and (Y7b) denotes an inverted pattern image obtained by inverting the image pattern (Y7a).

Although not shown in the figure, pattern images and inverted pattern images exist to a measurable resolution; for example, there exist pattern images and inverted pattern images corresponding to bit 6 to bit 0 of X coordinates and Y coordinates. The infrared light projection device 102 projects 40 patterns including the above patterns to the target object 107 in order. The image capture device 101 shoots the projected pattern images in order.

Figure 9:
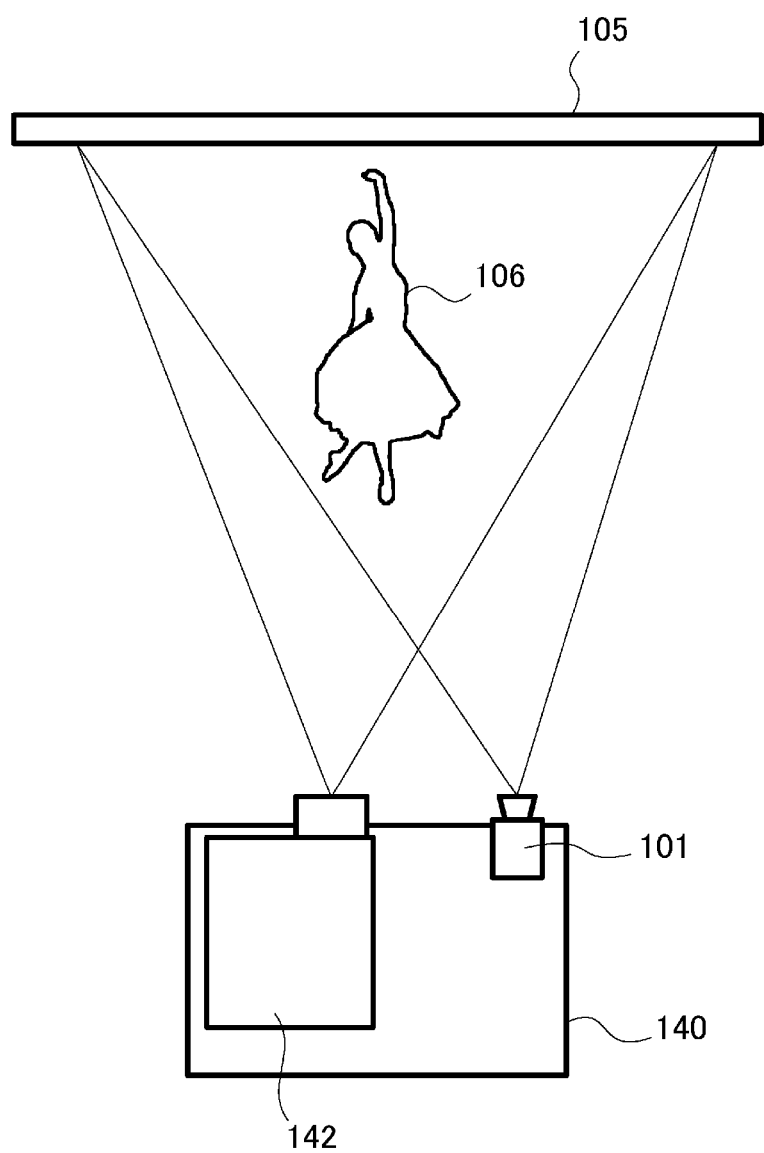
FIG. 9 is a diagram showing the configuration of a measuring projection device according to a modification of the embodiment.

FIG. 9 is a diagram showing the configuration of a measuring projection device according to a modification of the embodiment. The measuring projection device 140 according to the modification, which is an example in which the projection devices of each of the measuring projection devices 100 shown in FIGS. 1 and 7 are integrated together, has a projection device 142 including an infrared light projection device and a visible light projection device. The measuring projection device 140 having such an integration-type projection device 142 may be used.

(Functional Configuration of Measuring Projection Device)

Figure 10:
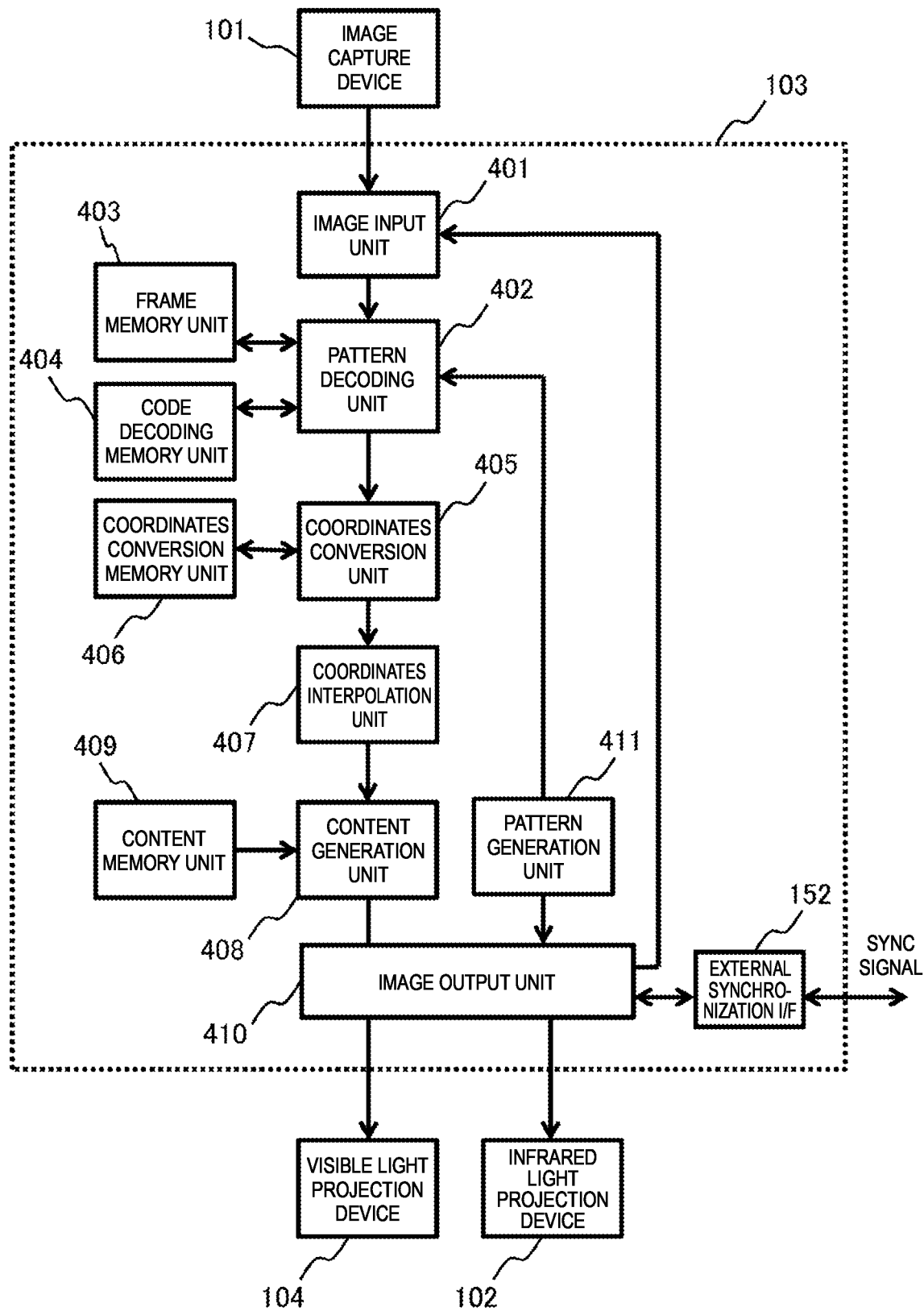
FIG. 10 is a block diagram showing a first example functional configuration of a measuring projection device according to the embodiment.

FIG. 10 is a block diagram showing a first example functional configuration of a measuring projection device according to the embodiment. A computing device 103 has a function of controlling the entire measuring projection device 100. For example, the computing device 103 can be implemented by a computing device as typified by a computer and a processor or a semiconductor integrated circuit. For example, the semiconductor integrated circuit is an ASIC (application-specific integrated circuit) or an FPGA.

The functions of respective constituent elements of the computing device 103 may be realized by using a memory in which computer programs for performing the functions of the respective constituent elements are installed and causing a processor incorporated in the semiconductor integrated circuit to run the computer programs successively.

The computing device 103 is equipped with an image input unit 401, a pattern decoding unit 402, a frame memory unit 403, a code decoding memory unit 404, a coordinates conversion unit 405, a coordinates conversion memory unit 406, a coordinates interpolation unit 407, a content generation unit 408, a content memory unit 409, an image output unit 410, and a pattern generation unit 411. Each memory unit in the computing device 103 may be constituted by a RAM, for example.

The computing device 103 is also equipped with an external synchronization interface (I/F) 152 which is an example timing control unit. Where a plurality of measuring projection devices 100 are controlled by timing control units provided inside the measuring projection devices, the external synchronization interface 152 of a master measuring projection device functions as a timing control unit and sends timing signals to the external synchronization interfaces 152 of the other, slave measuring projection devices. Where a plurality of measuring projection devices 100 are controlled by a timing control unit provided outside the measuring projection devices, a timing generator 151 provided outside functions as a timing control unit and sends timing signals to the external synchronization interfaces 152 of the plurality of slave measuring projection devices.

Where the external synchronization interfaces 152 is connected to the timing generator 151 or the external synchronization interface 152 of another measuring projection device, it may be, for example, a communication interface connected by wire or a communication interface connected wirelessly. The wired communication interface may be, for example, USB (Universal Serial Bus) or Ethernet (registered trademark). The wireless communication interface may be, for example, Bluetooth (registered trademark) or wireless LAN. Incidentally, the external synchronization interfaces 152 may be composed of a light source and an optical sensor of, for example, infrared light and control the operation timing between measuring projection devices by turning on/off of light or optical communication.

(Operation of Projection System)

Figure 11:
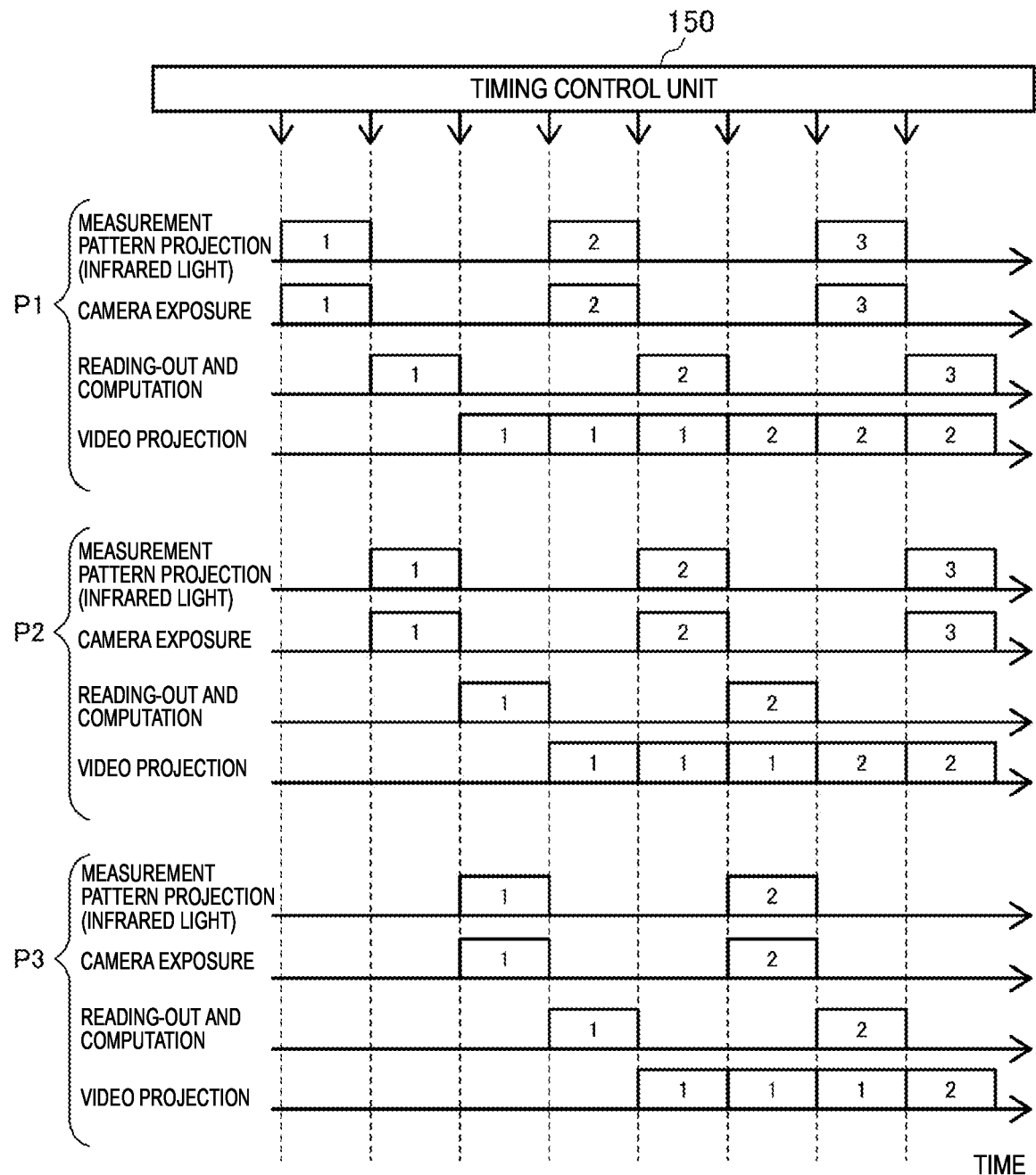
FIG. 11 is a time chart showing a first example operation of a projection system according to the embodiment.

FIG. 11 is a time chart showing a first example operation of a projection system according to the embodiment. In the embodiment, it is assumed that projection of an infrared light measurement pattern by the infrared light projection device 102, camera exposure by the image capture device 101, reading-out and computation, or video projection by the visible light projection device 104 is performed every prescribed unit time, the prescribed unit time being 1 ms, for example. The term "reading-out and computation" as used here means processing that the image capture device 101 reads out an image taken and transfers it to the computing device 103 (referred to below as reading-out and transfer processing or processing of transfer to the computing device 103) plus processing that the computing device 103 calculates position measurement information from the transferred image taken. The processing that the computing device 103 calculates position measurement information may be performed either at the same time as (parallel with) the reading-out and transfer processing performed by the image capture device 101 or after completion of all or part of the reading-out and transfer processing performed by the image capture device 101 (the processing of transfer to the computing device 103). Where the above two kinds of processing are performed at the same time (in parallel) as in the embodiment, calculation of position measurement information can be performed so as to overlap with a readout period by constructing a dedicated computing device using an FPGA, for example. Unlike in the embodiment, the time taken by the reading-out and transfer of an image taken need not always be the same as the time taken by the position information measurement. The above-described reading-out and transfer and calculation of position information measurement also apply to example operations to be described with reference to drawings that follow FIG. 11.

The pattern generation unit 411 turns on the infrared LED light source 112 of the infrared light projection device 102 in a measurement pattern projection period. The pattern generation unit 411 generates a pattern image for pattern projection by the above-described method. The pattern generation unit 411 outputs image data representing the pattern image to the image output unit 410 so as to allow the display device 113 of the infrared light projection device 102 to perform pattern projection for measurement. The image output unit 410 outputs the image data received from the pattern generation unit 411 and turn-on information for the infrared LED light source 112 to the infrared light projection device 102 and the image input unit 401. Since pattern light of measurement light representing the pattern image is projected in the form of invisible light, it does not influence the visual sense of a human though it is subjected to imaging by the image capture device 101 and measurement.

The pattern generation unit 411 can output one pattern in 1/6,000 sec. In each measurement pattern projection period, the pattern generation unit 411 outputs a total of 40 frames consisting of 10-bit coordinate images of X coordinates and Y coordinates and their inverted images. On the other hand, the image capture device 101 shoots 40 frames at the same rate as the frame output rate of the display device 113 (synchronized).

The image output unit 410 outputs a pattern image to the infrared light projection device 102 in synchronism with the image data output timing of the pattern generation unit 411. The infrared light projection device 102 projects a pattern image onto a target object. The image input unit 401 controls exposure of the image capture device 101 in synchronism with the pattern image output timing of the image output unit 410. Controlled in this manner, the image capture device 101 shoots a 40-frame pattern image in a camera exposure period.

The image input unit 401 receives the pattern image taken (data taken) by the image capture device 101 in a reading-out and computation period. The image input unit 401 sends the received data taken to the pattern decoding unit 402. The image input unit 401 determines a pattern corresponding to the received data taken in synchronism with the image output unit 410.

The pattern decoding unit 402 decodes the image taken representing the pattern image received from the image capture device 101 into projection coordinates information representing sets of projection coordinates corresponding to sets of imaging coordinates in the imaging coordinate system in the reading-out and computation period. The function of the pattern decoding unit 402 will be described below in more detail.

If the data taken received from the image input unit 401 represents an X coordinate/Y coordinate non-bit-inversion image, the pattern decoding unit 402 writes that data taken to the frame memory unit 403. If the data taken represents an X coordinate/Y coordinate bit-inversion image, the pattern decoding unit 402 calculates the difference between that image and a non-bit-inversion image recorded in the frame memory unit 403 in advance while reading out the latter. By taking the difference between a non-bit-inversion image and a bit-inversion image in this manner, discrimination between 0s and 1s of projection light is made possible without depending on the color of the projection target or ambient light. By judging a region where the difference is smaller than or equal to a prescribed value to be a region in which the projection light is not projected, that region can be eliminated from a measurement target region.

The code decoding memory unit 404 is provided with a writing region for each pixel of the image capture device 101. After taking the difference between a non-bit-inversion image and a bit-inversion image, the pattern decoding unit 402 writes individual bit values of Gray-coded coordinates data in writing regions bit by bit. This manipulation of writing coordinates data of 40 frames is performed during an exposure time of the image capture device 101. As a result, information that corresponds to each pixel of the image capture device 101 and indicates whether an X coordinate and a Y coordinate of the infrared light projection device 102 exist and 10-bit values representing the X coordinate and the Y coordinate (if they exist), respectively, are written to the code decoding memory unit 404. Finally, the pattern decoding unit 402 re-converts the Gray-coded coordinates data recorded in the code decoding memory unit 404 into binary data and outputs the latter to the coordinates conversion unit 405.

As a result of the pieces of processing performed so far, one can know from what pixel of the infrared light projection device 102 projection light that has reached a certain pixel position of the image capture device 101 has been projected. That is, one can know corresponding relationships between sets of projection coordinates of the infrared light projection device 102, that is, sets of projection coordinates in the projection coordinate system of the visible light projection device 104, and sets of imaging coordinates in the imaging coordinate system of the image capture device 101. Thus, if a positional relationship between the image capture device 101 and the infrared light projection device 102 is known, a distance to the target object can be obtained for each pixel in an image by triangulation. However, information thus obtained is distance information corresponding to each pixel in an image captured by the image capture device 101. Thus, in the embodiment, distance information of imaging coordinates corresponding to each pixel in an image captured by the image capture device 101 is converted into distance information corresponding to pixel coordinates of the infrared light projection device 102, that is, distance information of projection coordinates of the visible light projection device 104.

The coordinates conversion unit 405 writes data received from the pattern decoding unit 402 in a region, determined by addresses corresponding to sets of projection coordinates of the visible light projection device 104, of the coordinates conversion memory unit 406. Then the coordinates conversion unit 405 generates distance information corresponding to projection coordinates of the visible light projection device 104 by reading out each piece of distance information (an X coordinate and a Y coordinate of the visible light projection device 104 are read out in this order).

In doing so, a projection pixel having no corresponding point may occur. More specifically, light rays corresponding to a plurality of certain pixels of a pattern image projected onto the target object may be detected by one pixel in an image captured by the image capture device 101. In this case, from the characteristic of Gray codes, a projection pixel having no corresponding point is incorporated into one of two adjacent projection pixels and hence the other projection pixel comes not to have a corresponding point.

The coordinates interpolation unit 407 receives distance information corresponding to each set of projection coordinates of the visible light projection device 104 from the coordinates conversion unit 405. The coordinates interpolation unit 407 interpolates distance information at each set of projection coordinates having no distance information. This is done only at a position around which a certain number of sets of projection coordinates having distance information that enables interpolation exist, by an interpolation method such as linear interpolation using pieces of distance information of nearby sets of coordinates. The coordinates interpolation unit 407 outputs each piece of distance information calculated on the basis of pieces of projection coordinates to the content generation unit 408. As described above, a high-speed real-time position measuring operation is enabled by performing reading-out of an image taken of a pattern image and calculation of position information including information of distances to the target object.

The content generation unit 408 generates a video content for projection in a video projection period. The content generation unit 408 processes a video content recorded in the content memory unit 409 in advance on the basis of the distance information received from the coordinates interpolation unit 407 and outputs the processed video content to the image output unit 410. In the following, a term "processed video content" may be used to discriminate it from the unprocessed video content recorded in advance.

The content generation unit 408 generates a video content that is free of a coordinate deviation and corresponds to distances to the target object accurately. Furthermore, the content generation unit 408 can determine the details of a video content selectively according to distance information. For example, the content generation unit 408 can perform processing of cutting out and detecting only an object located at a certain distance and draw a video content for visible light projection accurately. The content generation unit 408 outputs a processed video content for projection to the image output unit 410.

The image output unit 410 outputs the video content for visible light projection generated in the video projection period to the visible light projection device 104. The visible light projection device 104 turns on the visible light source and projects video light corresponding to the video content. The display device of the visible light projection device 104 can output 30,000 binary frames per second. Thus, for example, a 256-gradation image can be projected using 255 frames in 8.5 ms. Since this projection is performed by the visible light source, the projected image can be recognized visually by a human. In the above-described manner, position measurement and projection can be performed continuously.

In the measuring projection device 100 according to the embodiment, since video projection and position measurement are performed by the same measuring projection device, occurrence of a deviation between a projection and a measurement can be suppressed in principle and a geometrical measurement can be performed in a superimposed manner without interfering with a visible light image. Furthermore, if the computing device 103 can decode a pattern image taken by the image capture device 101, the measuring projection device 100 can be used in practice even if the accuracy of its installation is not sufficiently high. This secures easy installation. Furthermore, high robustness can be obtained against increase of aging errors relating to installation.

Now, how a plurality of measuring projection devices operate in a projection system according to the embodiment will be described with reference to FIG. 11. In the embodiment, a timing control unit 150 such as the external synchronization interface 152 of a master measuring projection device or the external timing generator 151 generates and outputs timing signals, whereby an operation timing relationship between the plurality of measuring projection devices 100 is controlled. The external synchronization interface 152 of each measuring projection device receives the timing signal and inputs it to the image output unit 410, and output of a pattern image from the image output unit 410 and input of an image taken to the image input unit 401 are controlled according to the timing signal. The plurality of measuring projection devices are synchronized with each other in this manner.

FIG. 11 shows an example operation of a case that three measuring projection devices P1, P2, and P3 perform position measurements by turns in a time-divisional manner. In this example operation, the number of phases is three which is equal to the number of measuring projection devices. The plurality of measuring projection devices P1, P2, and P3 perform infrared light measurement pattern projection and camera exposure in order (by turns) according to a timing signal that is output from the timing control unit 150 every prescribed time. After completion of measurement pattern projection and camera exposure of the measuring projection device P1, measurement pattern projection and camera exposure of the measuring projection device P2 are performed and measurement pattern projection and camera exposure of the measuring projection device P3 follow. The unit time shown in FIG. 11 that is the interval between timing signals is 1 ms, for example. Thus, measurement pattern projection and camera exposure can be performed 1,000 times per second (1,000 fps) in order by the plurality of measuring projection devices.

After performing measurement pattern projection and camera exposure by turns in a time-divisional manner, the measuring projection devices P1, P2, and P3 perform reading-out of an image taken of a pattern image and calculation of position information including information of a distance to a target object at timings of the next unit times. Then the measuring projection devices P1, P2, and P3 generate video contents according to respective pieces of measured position information of the target object at timings of the next unit times and project videos. In FIG. 11, numbers "1," "2," and "3" shown in respective blocks indicating operation timings are example frame numbers; in the illustrate example, video projection of one frame is performed every three unit times (3 ms). Although timing deviations occur between sets of video projection frames of the plurality of measuring projection devices P1, P2, and P3, this does not affect the visual sense of a human because the deviations are as short as a small multiple of 1 ms.

In the above operation, each of the measuring projection devices P1, P2, and P3 projects measurement light at a projection timing that is different than the other measuring projection devices do. Since the projection range of the measuring projection device P1 overlaps with the projection ranges of the measuring projection devices P2 and P3, the measuring projection device P1 performs measurement light projection at a projection timing that is different from projection timings of the measuring projection devices P2 and P3. The projection range of the measuring projection device P2 overlaps with that of the measuring projection device P1 but does not overlap with that of the measuring projection device P3. Thus, the measuring projection devices P2 and P3 may perform measurement light projection at the same projection timing. The measuring projection device P2 performs measurement light projection at such a timing that the measuring projection device P1 performs reading-out of an image taken and calculation of position information (computation timing). The measuring projection device P2 performs reading-out of an image taken and calculation of position information at such a timing that the measuring projection device P1 performs measurement light projection. Furthermore, the measuring projection device P1 performs measurement light projection at such a timing that it performs projection of a video content.

As described above, in the embodiment, position measurement is performed on a target object in such a manner that the plurality of measuring projection devices perform projection of measurement light and exposure by turns while the timing control unit controls them. This operation makes it possible to prevent interference between measurement light beams of the plurality of measuring projection devices. In particular, adjacent measuring projection devices are prevented from projecting measurement light at the same time, whereby interference between measurement light beams in an overlap region of projection ranges can be prevented. Thus, each measuring projection device of the projection system can perform a proper position measurement. For example, when position measurement and video projection are performed on a moving target object such as a dancer using a plurality of measuring projection devices, video projection can be performed repeatedly while position measurement is performed accurately in real time. Furthermore, where there exist a fixed target object such as a screen and a moving target object such as a dancer, even a projection system using a plurality of measuring projection devices can measure positions of the target objects accurately in real time and generate and project video contents individually so that they are suitable for the positions of the target objects, respectively.

Figure 12:
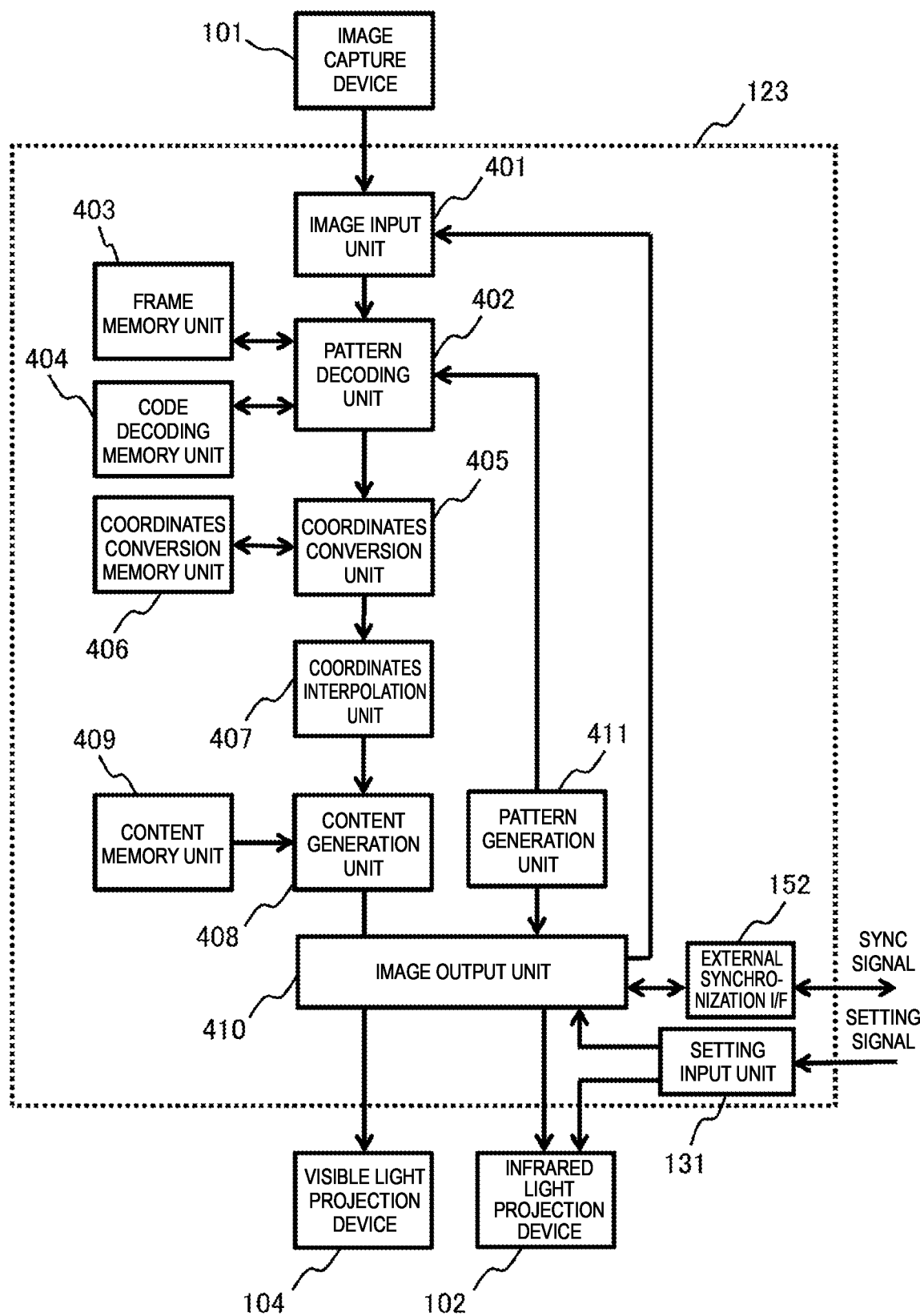
FIG. 12 is a block diagram showing a second example functional configuration of a measuring projection device according to the embodiment.

FIG. 12 is a block diagram showing a second example functional configuration of a measuring projection device according to the embodiment. The second example functional configuration of a measuring projection device is an example configuration that is obtained by changing part of the above-described first example configuration of a measuring projection device and adding a function. A computing device 123 employed in the embodiment has a setting input unit 131 to which setting information is input. The other part of the configuration and the other functions of the computing device 123 are the same as those of the computing device 103 of the first example, and hence only features that are different than in the first example will be described here.

The setting input unit 131 receives setting information to be used for setting a measurement light emission time division number and a light emission quantity of measurement light according to, for example, the number of phases of measuring projection devices that operate in order or the number of measuring projection devices that are used simultaneously. The setting information may be generated by an externally provided control device such as a computer and transmitted to the setting input unit 131 of the measuring projection device. The setting input unit 131 sends the received setting information to the image output unit 410 and the infrared light projection device 102 and thus serves to set a light emission time and a light emission quantity of measurement light.

In the embodiment, where n measuring projection devices perform position measurement by turns, a time period for which measurement pattern projection and camera exposure are performed is set at 1/n of a unit time. To compensate for the shortening of the measurement pattern projection periods to 1/n of the unit time, the light emission quantity of invisible measurement light is increased. For example, the drive current that flows when the infrared LED light source emits light is increased by a factor of n. This may be done by changing the peak power of the infrared LED light source when it emits light, according to a light emission time. To attain this purpose, the drive power can be controlled by various methods other than changing the drive current of the infrared LED light source, that is, by changing the drive voltage, the PWM ratio, or the like. Setting information including a divisional time of measurement pattern projection and camera exposure and an increased drive current is sent from the setting input unit 131 to the image output unit 410 and the infrared light projection device 102 and to the image input unit 401 via the image output unit 410.

Where the measuring projection device performs, at high speed, a series of pieces of processing of measurement pattern projection, camera exposure, reading-out and transfer of an image taken, computation of position information measurement, and video projection, it is highly probable that the processing of reading-out and transfer of an image taken becomes a rate determining step (i.e., bottleneck). Thus, to perform this series of pieces of processing at high speed, it is preferable that each processing time be made variable with the reading-out and transfer time made a reference (unit time). For example, the period of measurement pattern projection (and camera exposure) may be made 1/n of the reading-out and transfer time (unit time). It is preferable that the unit time be equal to a time that is taken to perform reading-out and transfer when the image capture device and/or the computing device has operated to show its full ability. Where as mentioned above the unit time is determined on the basis of the performance of the image capture device and/or the computing device, the unit time may be stored in a memory provided inside the measuring projection device in advance, transmitted from outside the measuring projection device over a desired network, or measured by conducting a test actually in the measuring projection device.

Figure 13:
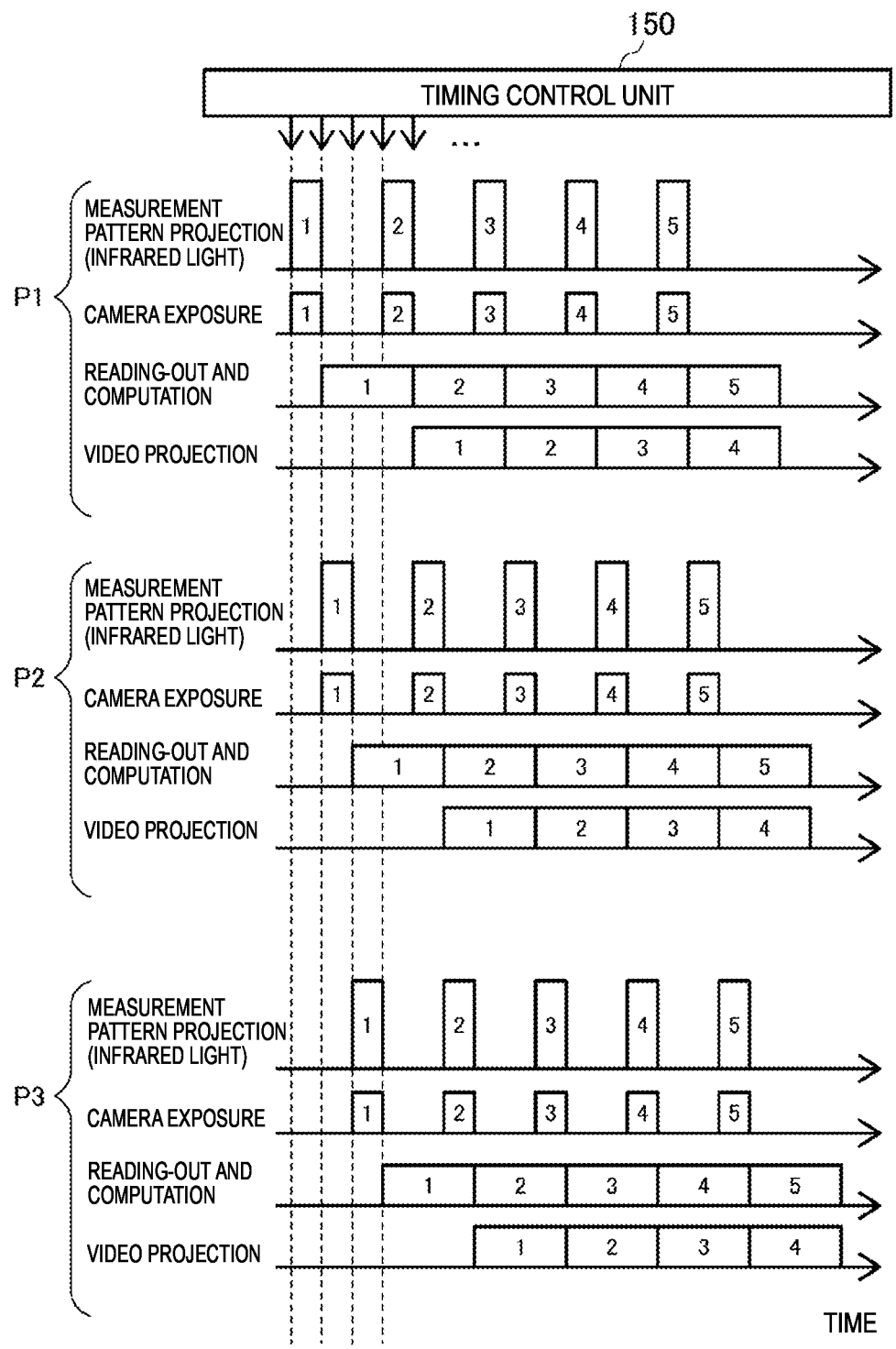
FIG. 13 is a time chart showing a second example operation of a projection system according to the embodiment.

FIG. 13 is a time chart showing a second example operation of a projection system according to the embodiment. FIG. 13 shows an example operation of a case that three measuring projection devices P1, P2, and P3 perform position measurements by turns in a time-divisional manner. In this case, the period of measurement pattern projection and camera exposure is set as short as ⅓ (e.g., ⅓ ms) of the ordinary unit time and the drive current (drive power) of the infrared LED light source is increased by a factor of 3. With this measure, the emission light quantity of the infrared LED light source is increased by a factor of 2 to 3, for example. In LED light sources etc., the drive current rating is determined by the average current per unit time. Thus, in the case of intermittent lighting having divisional light emission times, the maximum current can be increased while the average current in the unit time is kept the same. That is, the maximum light emission quantity can be increased without changing the power consumption. Incidentally, the number of phases in this example operation is three which is equal to the number of measuring projection devices.

The plurality of measuring projection devices P1, P2, and P3 perform infrared light measurement pattern projection and camera exposure in order (by turns) in ⅓ of a prescribed unit time according to timing signals that are output from the timing control unit 150. In the illustrated example, the measuring projection devices P1, P2, and P3 perform measurement pattern projection and camera exposure by turns in order of P1→P2→P3 in one unit time. Upon completion of measurement pattern projection and camera exposure, each of the measuring projection devices P1, P2, and P3 performs reading of an image taken of a pattern image and calculation of position information of a target object in one unit time and then performs generation of a video content and video projection in one unit time according to the position information of the target object. In this case, the time period for which infrared light measurement pattern projection and camera exposure are performed is shorter than the time period for which reading of an image taken and calculation of position information are performed.

In the embodiment, since the time period for which measurement pattern projection and camera exposure are performed is shortened by time division, projection using the plurality of measuring projection devices can be performed while the frame rate of position measurement and video projection is kept the same. Furthermore, the accuracy of position measurement can be increased by increasing the emission light quantity of measurement light.

Figure 14:
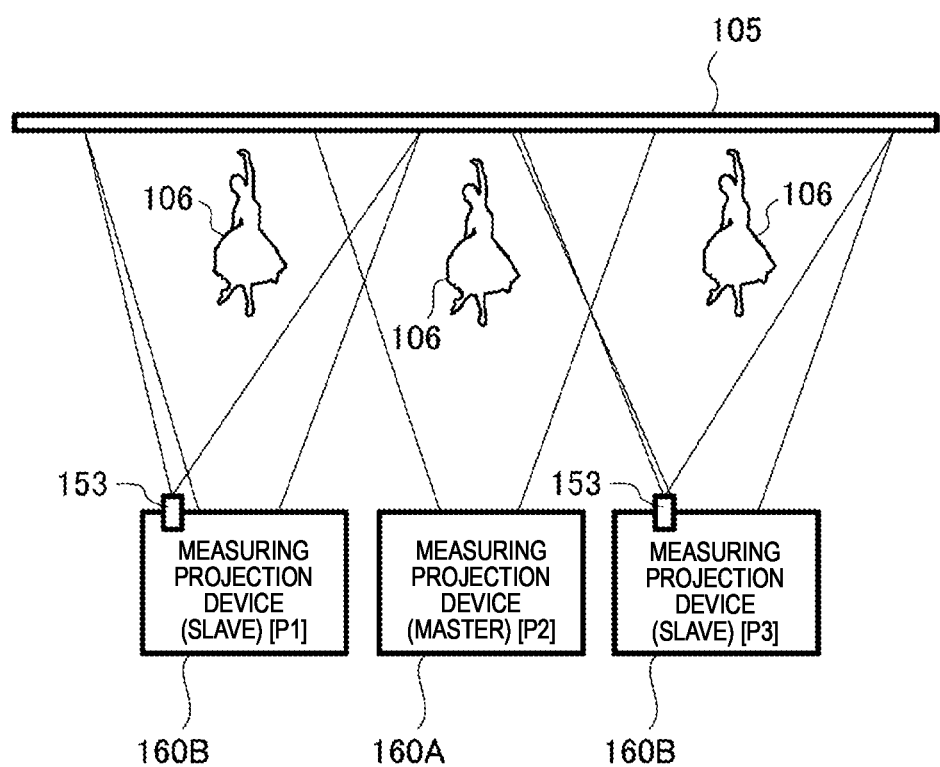
FIG. 14 is a diagram showing a third example configuration of a projection system according to the embodiment.

FIG. 14 is a third example configuration of a projection system according to the embodiment. The third example configuration of a projection system is an example configuration in which the configuration of the timing control unit of each measuring projection device is changed. The projection system according to the embodiment is equipped with a plurality of measuring projection devices which are a master measuring projection device 160A and slave measuring projection devices 160B. Each slave measuring projection device 160B is equipped with an optical sensor 153 for detecting invisible measurement light. Like the external synchronization interface 152 of each measuring projection device of the first example, the optical sensor 153 functions as a timing control unit. The other part of the configuration and the other functions are the same as in the above-described first example and second example, and hence only different features will be described here.

Figure 15:
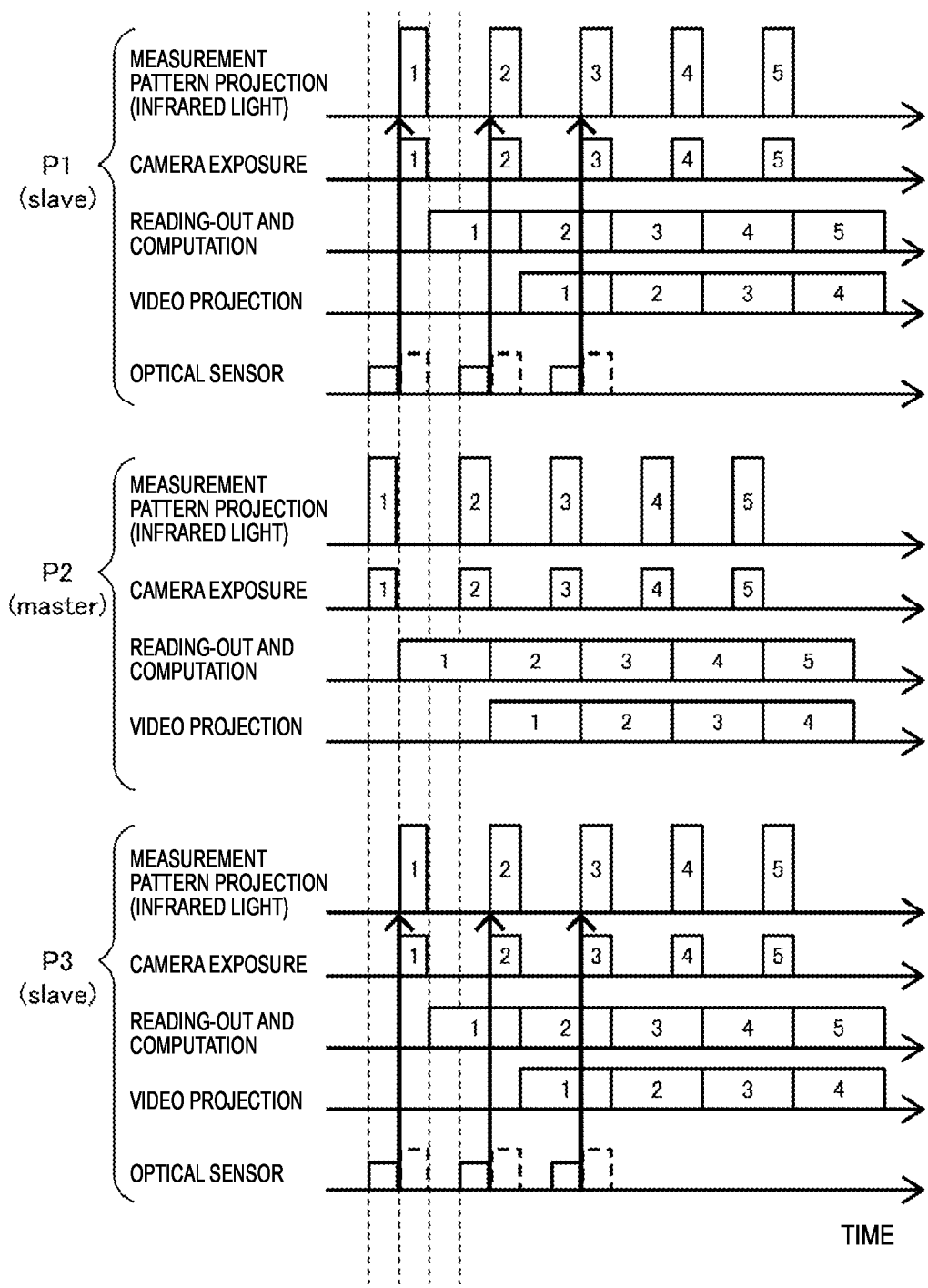
FIG. 15 is a time chart showing a third example operation of the projection system according to the embodiment.

FIG. 15 is a time chart showing a third example operation of the projection system according to the embodiment. FIG. 15 shows an example operation of a case that the three measuring projection devices P1, P2, and P3 perform position measurement by turns in a time-divisional manner. In this example, the central measuring projection device P2 functions as a master and the left-hand measuring projection device P1 and the right-hand measuring projection device P3 function as slaves. In this example operation, the number of phases is two which is smaller than the number of measuring projection devices.

First, the master measuring projection device P2 performs measurement pattern projection and camera exposure. In this period, since the projection ranges of adjacent measuring projection devices overlap with each other, in each of the slave measuring projection devices P1 and P3 invisible measurement light is received by the optical sensor 153 and projection of master measurement light is thereby detected. Each of the slave measuring projection devices P1 and P3 receives, by the optical sensor 153, as a timing signal, invisible measurement light projected by the master measuring projection device P2.

Upon completion of the projection of measurement light by the master measuring projection device P2, each of the slave measuring projection devices P1 and P3 detects the stop of emission of measurement light by the optical sensor 153 and inputs, to the image output unit 410, a timing signal to serve as a trigger for a start of projection of a measurement pattern. In response, each of the slave measuring projection devices P1 and P3 performs measurement pattern projection and camera exposure. In the illustrated example, as in the second example operation of a projection system shown in FIG. 13, the emission time of measurement light is divided and the emission light quantity of measurement light is increased. While each of the slave measuring projection devices P1 and P3 is projecting measurement light, the optical sensor 153 detects the measurement light projected by the self device. For example, each of the slave measuring projection devices P1 and P3 may detect only measurement light projected by the master measuring projection device P2 by, for example, masking an output of the optical sensor 153 during measurement pattern projection of the self device.

In the above operation, since the projection range of the measuring projection device P2 overlaps with that of each of the measuring projection devices P1 and P3, the measuring projection device P2 projects measurement light at a projection timing that is different than the measuring projection devices P1 and P3 do. Whereas the projection range of the measuring projection device P1 overlaps with that of the measuring projection device P2, it does not overlap with that of the measuring projection device P3. Thus, the measuring projection devices P1 and P3 project measurement light at the same projection timing. With this measure, the number of phases can be made smaller than the number of measuring projection devices. That is, target objects can be measured efficiently in an even shorter time while interference between measurement light beams is prevented.

Upon completion of measurement pattern projection and camera exposure by itself, each of the measuring projection devices P1, P2, and P3 performs reading-out of an image taken of a pattern image and calculation of position information of the target objects in one unit time and then performs generation of a video content and video projection in one unit time according to the position information of the target objects.

In the embodiment, since the timing control units are provided which are optical sensors, a timing control for measurement light beams of the plurality of measuring projection devices can be performed without providing communication units such as external synchronization interfaces or the like.

As described above, the projection system according to the embodiment is a projection system including the plurality of measuring projection devices 100 as projection devices which perform position measurement and projection on target objects 105 and 106. Each of the measuring projection devices 100 is equipped with the invisible light projection device 102 which projects invisible measurement light onto the target objects, the image capture device 101 which receives reflection light, reflected from the target objects, of the measurement light, the computing device 103 which calculates position information of the target objects on the basis of the reflection light of the measurement light, and the visible light projection device 104 which projects a visible light video content on the basis of the position information of the target object. A first measuring projection device and a second measuring projection device of the plurality of measuring projection devices 100 project the measurement light at different projection timings.

With this configuration, interference between measurement light beams can be prevented in the plurality of projection devices. Even in a case that, for example, projection ranges of adjacent projection devices overlap with each other, interference between measurement light beams can be prevented by setting different projection timings for respective measurement light beams, whereby proper position measurement is enabled. Thus, measurement of target objects and video projection can be performed properly in the projection system employing the plurality of projection devices.

In the projection system, the infrared light projection device 102 of the second measuring projection device projects the measurement light while the computing device 103 of the first measuring projection device performs a computation relating to the position information. With this measure, target objects can be measured efficiently in a short time while interference between measurement light beams is prevented.

In the projection system, the computing device 103 of the second measuring projection device performs a computation relating to the position information and calculates a shape and a position of the target objects while the visible light projection device 104 of the first measuring projection device projects the video content. With this measure, target objects can be measured efficiently in a short time while interference between measurement light beams is prevented.

In the projection system, the infrared light projection device 102 of the first measuring projection device projects the measurement light while the visible light projection device 104 of the first measuring projection device projects the video content. With this measure, measurement of target objects and video projection can be performed efficiently in a short time while interference between measurement light beams is prevented.

In the projection system, the infrared light projection device 102 of the second measuring projection device projects the measurement light while information relating to the reflection light received by the image capture device 101 is transferred to the computing device 103. With this measure, target objects can be measured efficiently in a short time.

In the projection system, in each of the measuring projection devices 100 a time period for which the infrared measurement light is projected is shorter than a time period for which information relating to the reflection light received by the image capture device 101 is transferred to the computing device 103. For example, the measuring light is emitted in such a short time as 1/(the number of the plurality of measuring projection devices in the projection system) of the time period for which information relating to the reflection light received by the image capture device 101 is transferred to the computing device 103. This measure enables position measurement of target objects in a short time, whereby target objects can be measured efficiently in a short time. Furthermore, the emission light quantity can be increased as the emission time of measurement light is shortened. This contributes to increase of the accuracy of the position measurement.

In the projection system, in each of the measuring projection devices 100 the time period for which the measurement light is projected is set according to at least one of the number of measuring projection devices in the projection system, the number of measuring projection devices that are used at the same time in the projection system, and the number of phases of measuring projection devices that operate in order in the projection system. For example, where three measuring projection devices are used, the time period for which the measurement light is projected is set at ⅓ of an ordinary computation time and an ordinary projection time. The light quantity of the measurement light is set at, for example, three times an ordinary value. By shortening the projection time of the measurement light by dividing it in this manner, positions of target objects can be measured in a short time, which makes it possible to perform projection using a plurality of measuring projection devices while the frame rate of position measurement and video projection is kept the same. Furthermore, since the emission light quantity of the measurement light is increased, the accuracy of position measurement can be increased.

In the projection system, in each of the measuring projection devices 100 the drive power of a light source of the infrared light projection device 102 is adjusted according to the set time period for which the invisible measurement light is projected. For example, the peak power of light emission of an infrared LED light source is changed according to the emission time of the invisible measurement light, for example, the number of phases of the measuring projection devices in the projection system. With this measure, the maximum power and the maximum light emission quantity can be increased in a state that the average power in a unit time of light emission of measurement light is kept the same, whereby the accuracy of position measurement can be increased.

In the projection system, the timing control unit 150 which controls the projection timings is provided and each of the measuring projection devices 100 receives a timing signal from the timing control unit 150 and projects the measurement light at a prescribed timing that is in accordance with the timing signal. For example, the timing generator 151 provided outside the devices, the external synchronization interfaces 152 provided in the respective devices, or the optical sensors 153 for detecting invisible light are used as the timing control unit 150. With this measure, the projection timings of measurement light can be controlled and synchronized with each other properly in the plurality of measuring projection devices 100.

In the projection system, each of the first measuring projection device and the second measuring projection device functions as, for example, a slave, receives a timing signal from the timing control unit 150 which controls the projection timings, and projects the measurement light at a prescribed timing that is in accordance with the timing signal. With this measure, the projection timings of measurement light can be controlled and synchronized with each other properly in the plurality of measuring projection devices 100.

In the projection system, the second measuring projection device functions as, for example, a slave, receives a timing signal from the first measuring projection device which functions as a master, and projects the measurement light at a prescribed timing that is in accordance with the received timing signal. With this measure, the projection timings of measurement light can be controlled and synchronized with each other properly in the plurality of measuring projection devices 100.

In the projection system, the second measuring projection device has the optical sensor 153 which detects invisible light, and receives the invisible measurement light projected by the first measuring projection device by the optical sensor 153 as the timing signal. By using, in this manner, as a timing signal, measurement light projected by another measuring projection device, the projection timings of measurement light can be controlled and synchronized with each other properly.

In the projection system, a third measuring projection device the projection range of the measurement light of which overlaps with the projection range of the measurement light of each of the first measuring projection device and the second measuring projection device projects the measurement light at a different projection timing than each of the first measuring projection device and the second measuring projection device does. With this measure, interference between measurement light beams can be prevented in a plurality of measuring projection devices and measurement of target objects and video projection can be performed properly in a projection system employing a plurality of projection devices.

In the projection system, a third measuring projection device the projection range of the measurement light of which overlaps with the projection range of the measurement light of the first measuring projection device but does not overlap with the projection range of the measurement light of the second measuring projection device projects the measurement light at the same projection timing as the second measuring projection device does. With this measure, target objects can be measured efficiently in a short time while interference between measurement light beams can be prevented in a plurality of measuring projection devices.

The projection device according to the embodiment is the measuring projection device 100 in the projection system including the plurality of projection devices which perform position measurement and projection on target objects 105 and 106. The measuring projection device 100 is equipped with the infrared light projection unit 102 which projects infrared measurement light (invisible light) onto the target objects, the image capture unit 101 which receives reflection light, reflected from the target objects, of the measurement light and performs capture of image using it, the computing device 103 which calculates position information of the target objects on the basis of the reflection light of the measurement light; and the visible light projection device 104 which projects a visible light video content on the basis of the position information of the target objects. The measuring projection device 100 projects the measurement light at a different projection timing than the other measuring projection devices do. With this configuration, measurement of target objects and video projection can be performed properly in a projection system employing a plurality of projection devices.

The projection device receives a timing signal from another, first measuring projection device and projects the measurement light at a prescribed timing that is in accordance with the timing signal. With this measure, the projection timing of measurement light can be controlled properly in the plurality of measuring projection devices 100, whereby synchronization with the other measuring projection devices is made and interference between measurement light beams can be prevented.

The projection device transmits a timing signal to another, second measuring projection device and causes it to project measurement light at a prescribed timing that is in accordance with the timing signal. With this measure, the projection timing of measurement light can be controlled properly in the plurality of measuring projection devices 100, whereby synchronization with the other measuring projection devices 100 is made and interference between measurement light beams can be prevented.

The projection method according to the embodiment is a projection method in the projection system including the plurality of measuring projection devices 100 as projection devices which perform position measurement and projection on target objects 105 and 106. Each of the projection devices 100 projects infrared measurement light (invisible light)

onto the target objects by the infrared light projection device 102, receives reflection light, reflected from the target objects, of the measurement light and performs capture of image using it by the image capture device 101, calculates position information of the target objects on the basis of the reflection light of the measurement light by the computing device 103, and projects a visible light video content on the basis of the position information of the target objects by the visible light projection device 104. A first measuring projection device and a second measuring projection device of the plurality of measuring projection devices 100 project the measurement light at different projection timings. With this method, measurement of target objects and video projection can be performed in a projection system employing a plurality of projection devices.

Next, a projection adjusting program and a projection adjustment method that make it possible to recognize a positional relationship between a plurality of projection ranges in adjusting projection operation items such as projection times and projection ranges in a projection system having a plurality of projection devices will be described as another embodiment.

(Configurations of Projection System and Projection Adjustment Device)

Figure 16:
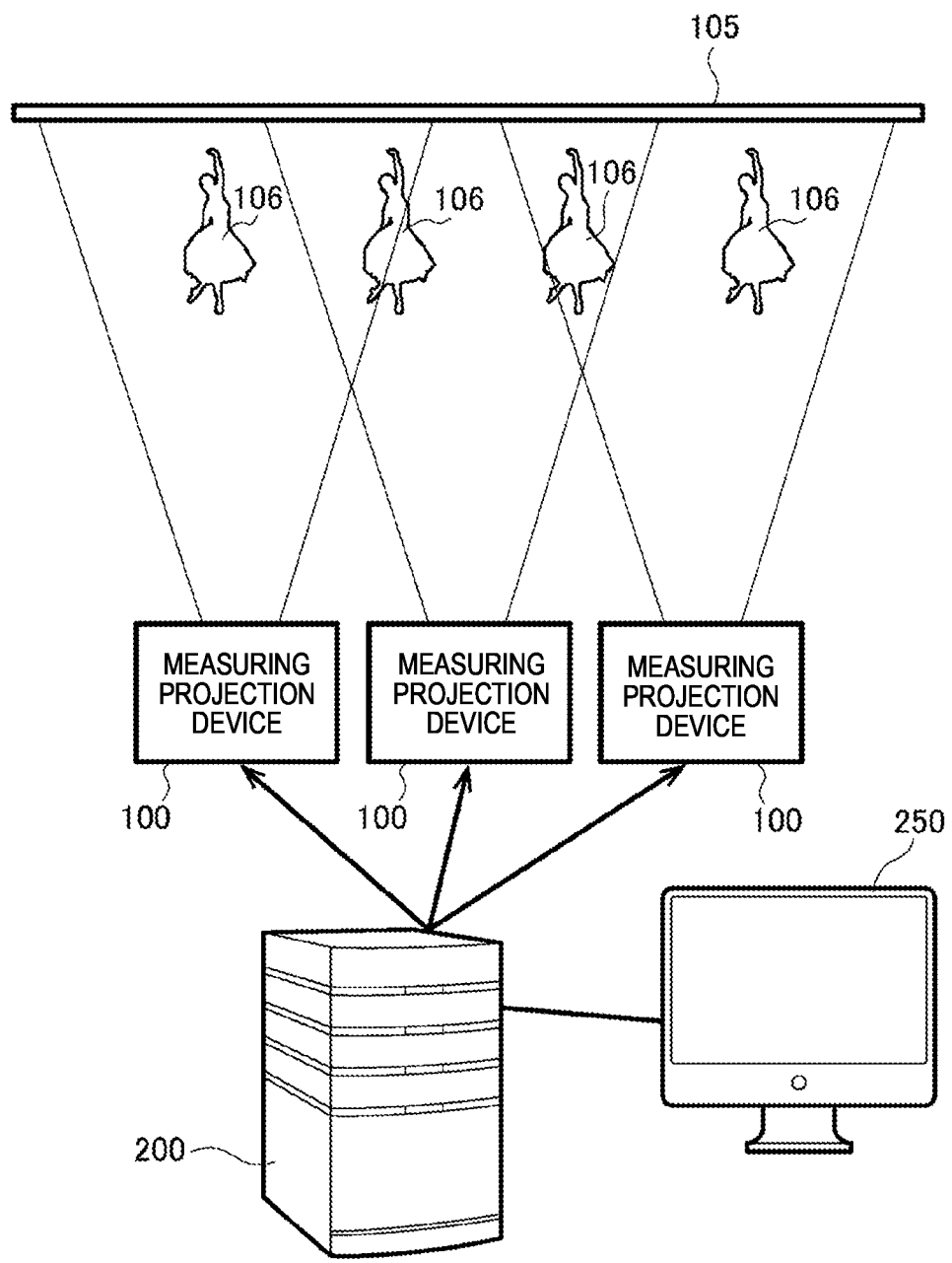
FIG. 16 is a diagram showing a fourth example configuration of a projection system according to the embodiment.

FIG. 16 is a diagram showing a fourth example configuration of a projection system according to this embodiment. This embodiment is directed a case that in the projection system shown in FIG. 16 projection operations of a plurality of measuring projection devices 100 are adjusted or a user's work of adjusting projection operations is assisted using a projection adjustment device 200 constituted by a personal computer (PC) or the like. In this example, a case is assumed that the projection ranges of the plurality of respective measuring projection devices 100 are set so as to overlap with each other and to cover a wide area when multi-plane projection is performed on target objects 105 and 106 by the plurality of measuring projection devices 100.

Connected to a monitor 250 having a display for information display, the projection adjustment device 200 displays, on the monitor 250, a display picture including various kinds of projection information for adjustment of projection operations. Constituted by an information processing device such as a PC having a processor and a memory, the projection adjustment device 200 realizes such functions as display of projection information and automatic adjustment of projection operations by running a prescribed computer program.

Figure 17:
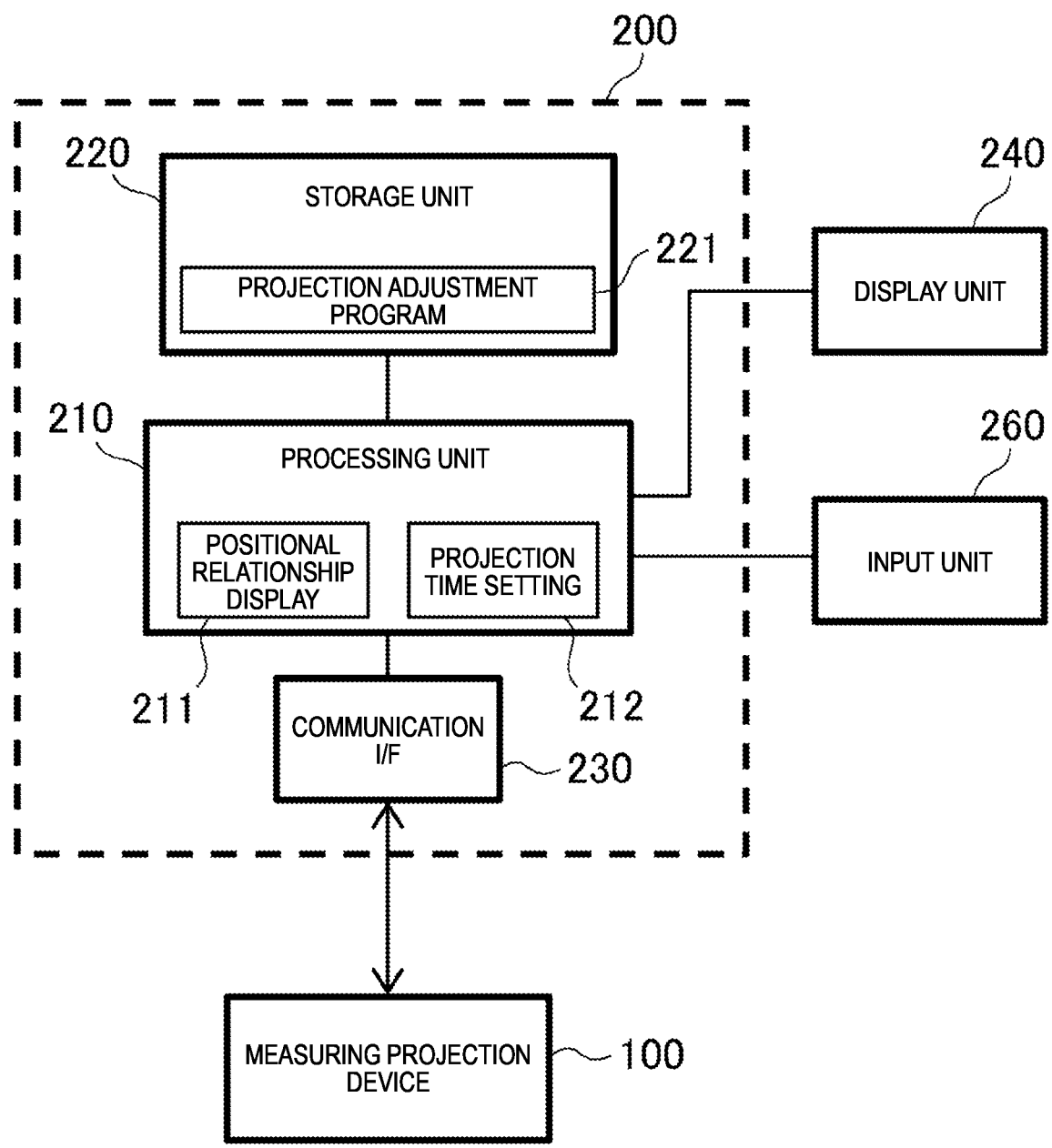
FIG. 17 is a block diagram showing a functional configuration of the projection adjustment device according to the embodiment.

FIG. 17 is a block diagram showing a functional configuration of the projection adjustment device according to the embodiment. The projection adjustment device 200 is equipped with a processing unit 210, a storage unit 220, and a communication interface (I/F) 230. Connected to the measuring projection devices 100 via the communication interface 230, the projection adjustment device 200 transmits and receives various kinds of information such as setting information relating to a measurement operation, projection range information, and position measurement information of target objects. Connected to a display unit 240 and an input unit 260, the projection adjustment device 200 displays a display picture on the display unit 240 and receives a manipulation instruction from the input unit 260.

The storage unit 220 has a memory device including at least one of a semiconductor memory such as a flash memory, a storage device such as an SSD (solid-state drive) or an HDD (hard disk drive), etc. The storage unit 220 is stored with a projection adjustment program 221 for realizing functions relating to adjustment of projection operations.

The processing unit 210 has a processor such as a CPU (central processing unit) or a DSP (digital signal processor). The processing unit 210 executes a process according to the projection adjustment program 221 and thereby realizes such functions as positional relationship display 211 and projection time setting 212.

The communication interface 230 is an interface that transmits and receives information to and from external devices such as the measuring projection devices 100 by a wired communication or a wireless communication. USB (Universal Serial Bus), Ethernet (registered trademark), etc. may be used as a wired communication interface. Bluetooth (registered trademark), wireless LAN, etc. may be used as a wireless communication interface.

The projection adjustment device 200 displays, as a function of the positional relationship display 211, projection position information such as an arrangement of projection ranges of the plurality of measuring projection devices, manners of overlap between the projection ranges, and a connection relationship between the projection ranges in any of various display forms such as figure display, text display, icon display, and graphic display. The projection adjustment device 200 makes, as a function of the projection time setting 212, projection time-related settings such as a projection timing relationship between the plurality of measuring projection devices and projection order or phases on the basis of the projection position information such as the arrangement of projection ranges of the respective measuring projection devices and the connection relationship between the measuring projection devices.

(Operation of Projection System)

A description will now be made of setting of projection times and an arrangement of projection ranges in a projection system having a plurality of measuring projection devices.

Figure 18A:
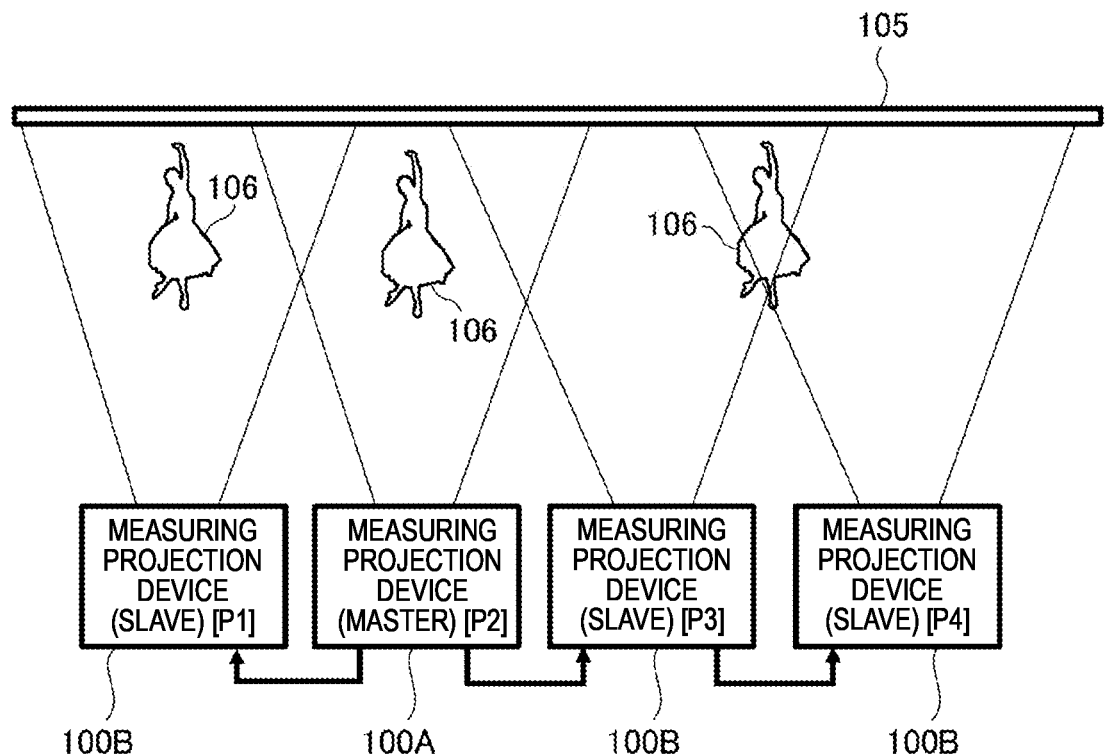
FIG. 18A is a diagram showing a fourth example configuration of a projection system according to the embodiment.

FIG. 18A is a diagram showing a fourth example configuration of a projection system according to the embodiment. The projection system of the fourth example is equipped with a plurality of (in the illustrated example, four) measuring projection devices 100A and 100B and performs position measurement and video projection on target objects 105 and 106 by these measuring projection devices 100A and 100B.

In the fourth example, one measuring projection device (P2) 100A functions as a master and the other measuring projection devices (P1, P3, and P4) 100B function as slaves. Although FIG. 18A is drawn in such a manner that a timing control unit is provided inside the master measuring projection device 100A, the timing control unit may be provided outside the measuring projection device 100A. The measuring projection device P2 projects measurement light in a first projection period from the self device as a master or projects measurement light in a first projection period after receiving a timing instruction as a slave. The configuration of the plurality of measuring projection devices is not limited to one in which they are connected to each other by wired communication interfaces to synchronize measurement light projection timings, and may be one in which they are connected to each other by wireless communication interfaces. As a further alternative, a configuration is possible in which measurement light projection timings are synchronized using optical sensors as shown in the third example projection system shown in FIG. 14. Upon completion of the measurement pattern projection by the measuring projection device P2, the measuring projection devices P1 and P3 located on the two respective sides of it project measurement patterns in the next projection period. In this manner, interference between measurement light beams projected by the plurality of measuring projection devices adjacent to each other is prevented.

Figure 18B:
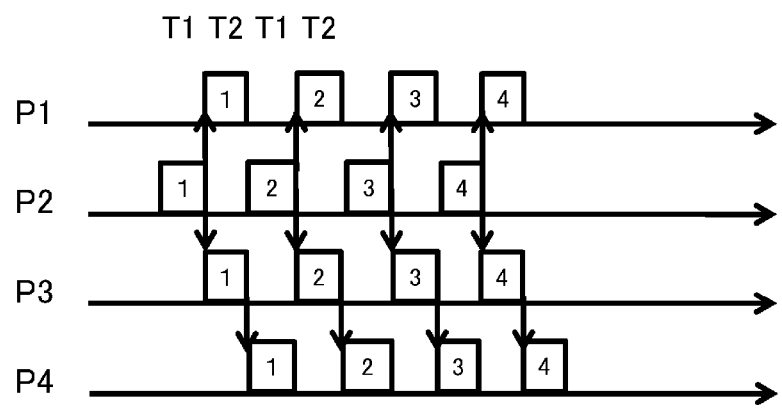
FIG. 18B is a time chart showing an example of measurement pattern projection times in the fourth example projection system according to the embodiment.

FIG. 18B is a time chart showing an example of measurement pattern projection times in the fourth example projection system according to the embodiment. The measuring projection device P2 projects a measurement pattern in a first projection period (first phase T1). At a timing when the measurement pattern projection by the measuring projection device P2 has completed, each of the two adjacent measuring projection devices P1 and P3 projects a measurement pattern in the next projection period (second phase T2). At a timing when the measurement pattern projection by the measuring projection devices P1 and P3 have completed, the measuring projection device P2 projects a measurement pattern again as the first phase T1. At this time, the measuring projection device P4 which is located adjacent to the measuring projection device P3 projects, as the first phase T1, a measurement pattern at the same time as the measuring projection device P2 does.

As described above, since the projection range of the measuring projection device P2 overlaps with that of each of the measuring projection devices P1 and P3, the measuring projection device P2 projects measurement light at the projection timing (first phase T1) that is different from the projection timing at which each of the measuring projection devices P1 and P3 projects measurement light. The measuring projection devices P1 and P3 project measurement light beams at the same timing (second phase T2) because the projection range of the measuring projection device P1 overlaps with that of the measuring projection device P2 but does not overlap with that of the measuring projection device P3.

The projection adjustment device 200 can determine order, phases, projection timings, etc. of projection operations of the above-described plurality of respective measuring projection devices P1 to P4 that relate to projection times of the measuring projection devices P1 to P4 on the basis of the arrangement of the projection ranges and other factors and set them in the measuring projection devices P1 to P4. A specific example process that is executed according to the projection adjustment program in the projection adjustment device 200 will be described later.

Since the four measuring projection devices project measurement light beams by turns in the above-described manner, interference between the measurement light beams can be prevented even though the projection ranges of adjacent measuring projection devices overlap with each other. Furthermore, where two of the projection ranges overlap with each other, position measurement and video projection can be performed in the plurality of measuring projection devices in a shorter time by projecting measurement light beams by turns using two phases.

Figure 19A:
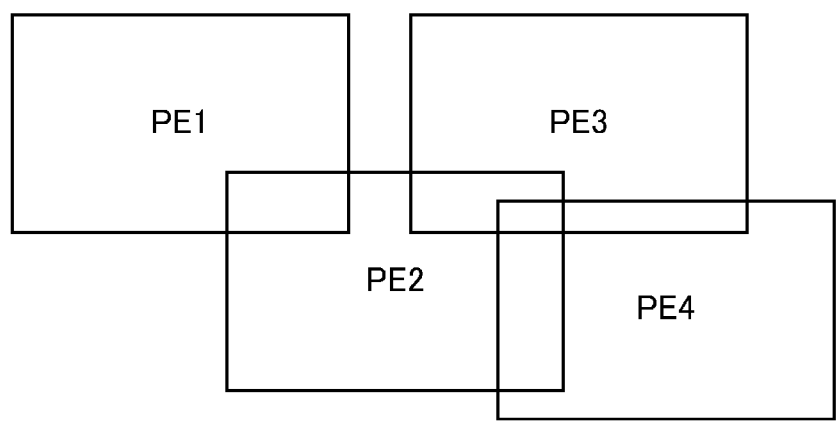
FIG. 19A is a diagram showing an example set of projection ranges in the fourth example projection system according to the embodiment.

FIG. 19A is a diagram showing an example set of projection ranges in the fourth example projection system according to the embodiment. In the fourth example projection system, it is assumed that the projection ranges of the respective measuring projection devices P1 to P4 are arranged as shown in FIG. 19A, for example. In this case, the projection adjustment device 200 acquires the projection ranges using position measurement information of sets of projection coordinates obtained by position measurement by each of the measuring projection devices P1 to P4. The projection adjustment device 200 displays a projection range PE1 of the measuring projection device P1, a projection range PE2 of the measuring projection device P2, a projection range PE3 of the measuring projection device P3, a projection range PE4 of the measuring projection device P4 on the display unit 240 in the form of rectangular figures shown in the illustrated example. A user can recognize the projection ranges of the plurality of respective measuring projection devices P1 to P4 by seeing a display of such projection position information.

Figure 19B:
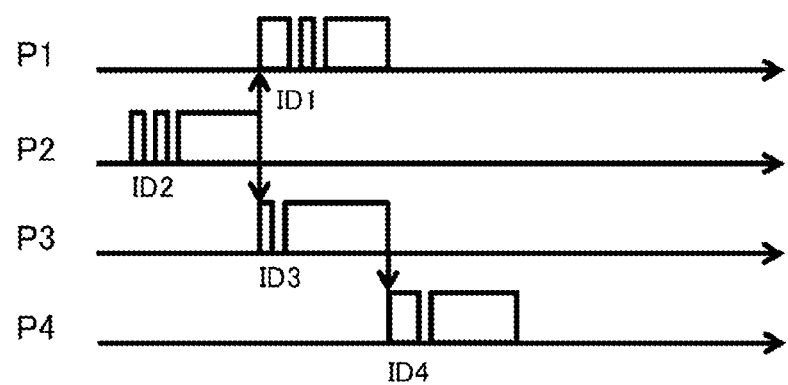
FIG. 19B is a time chart showing a measurement pattern projection operation in the fourth example projection system according to the embodiment.

FIG. 19B is a time chart showing a measurement pattern projection operation in the fourth example projection system according to the embodiment. In displaying measurement patterns, the measuring projection devices P1 to P4 can emit measurement patterns including ID codes indicating device IDs that are unique to the individual devices, respectively. In the illustrated example, ID1, ID2, 1D3, and ID4 are set for the respective measuring projection devices P1, P2, P3, and P4 and the measuring projection devices P1 to P4 project measurement patterns including their own ID codes at their heads, respectively. When the measuring projection device P2 has projected measurement light, the measuring projection devices P1 and P3 whose projection ranges overlap with the projection range of the measuring projection device P2 can detect the measurement light projection by the measuring projection device P2. Thus, at the end of the measurement light projection by the measuring projection device P2 the measuring projection devices P1 and P3 can recognize that they can project measurement light. As a result, even in a case that the projection ranges of a plurality of measuring projection devices overlap with each other in a complicated manner, each measuring projection device can recognize measurement light projection of each of other measuring projection devices and hence can properly judge a timing when the self device is to project measurement light.

(Example Projection Adjustment Method)

Figure 20:
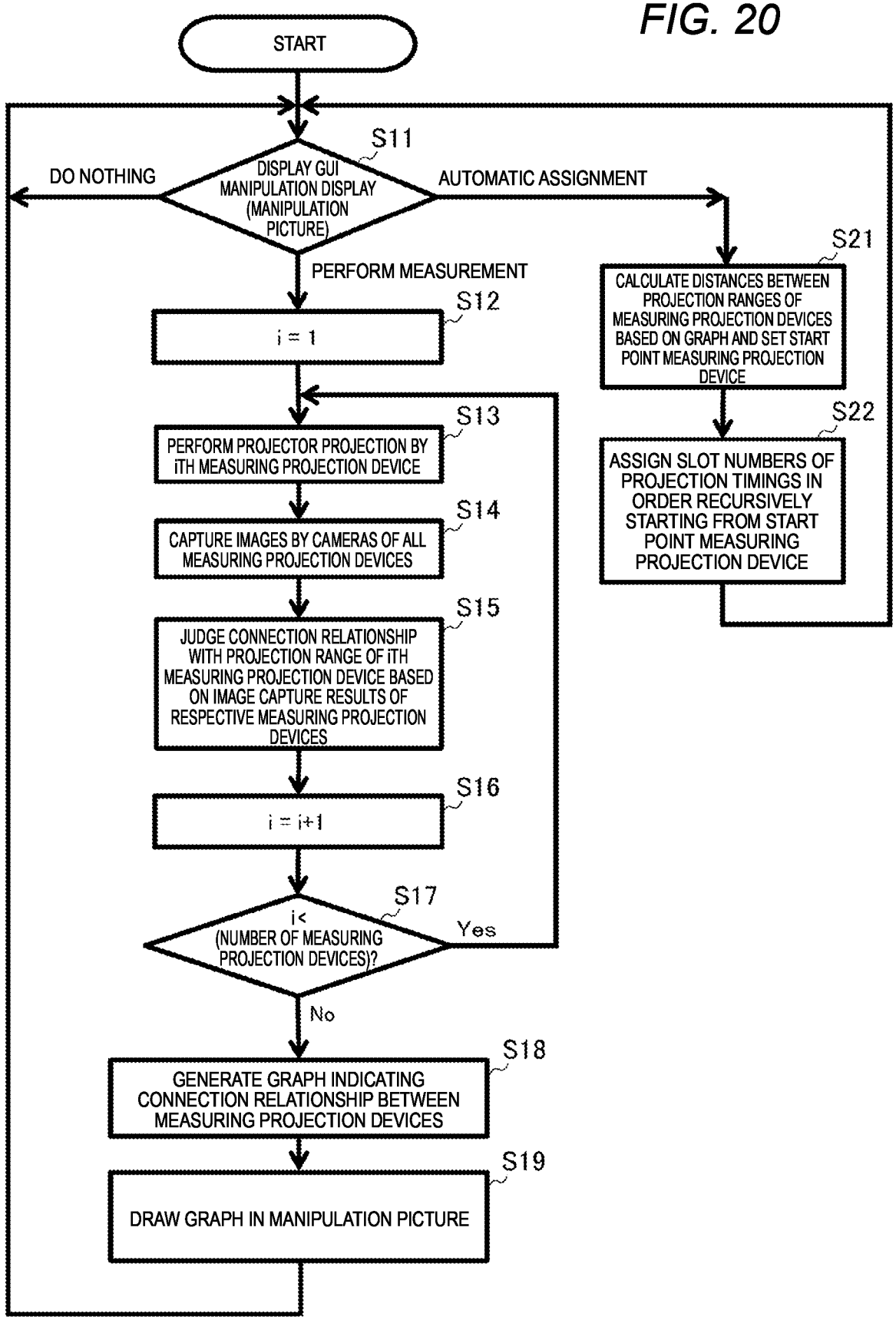
FIG. 20 is a flowchart showing the procedure of a projection adjustment method of the projection adjustment device according to the embodiment.

FIG. 20 is a flowchart showing the procedure of a projection adjustment method of the projection adjustment device according to the embodiment. Here an example procedure for displaying a connection relationship between a plurality of projection ranges and setting projection timings of the respective measuring projection devices will be described as the procedure of a process relating to the positional relationship display 211 and the projection time setting 212 which are performed according to the projection adjustment program 221.

In the projection adjustment device 200, the processing unit 210 executes the process according to the projection adjustment program 221. First, the projection adjustment device 200 displays a GUI manipulation picture, that is, a manipulation picture for user manipulation, on the display unit 240 as a user interface (S11). Then the projection adjustment device 200 executes the following process according to a user manipulation that has been made. If a user makes a manipulation as an instruction to perform a measurement, the projection adjustment device 200 initializes a count i (counter value) of measuring projection devices to "1" (S12) and then causes the ith (in the initial state, first) measuring projection device to perform projector projection (S13). The ith measuring projection device is caused to perform above-described measurement light projection as the projector projection. At this time, the projection adjustment device 200 causes the cameras of the image capture devices of all the measuring projection devices to shoot a projection image of the measurement light emitted from the ith measuring projection device (S14).

The projection adjustment device 200 judges a connection relationship of the projection range of the ith measuring projection device (i.e., presence/absence of an overlap, a measuring projection device(s) with which an overlap is found, etc.) on the basis of image capture results of all the measuring projection devices (S15). If a projection range overlap exists, another (or other) measuring projection device succeeds in capturing the measurement light image. A projection range connection relationship between the plurality of measuring projection devices can be judged on the basis of a position(s) of the measuring projection device (s) that has succeeded in capturing the measurement light image.

Then the projection adjustment device 200 sets the count i of measuring projection devices to i+1 (S16) and judges whether the count i is smaller than the number of measuring projection devices (S17). If the count i is smaller than the number of measuring projection devices (S17: yes), that is, if there remains a measuring projection device(s) for which a projection range connection relationship has not been judged yet, steps S13 to S17 are executed again in the same manners as described above. That is, the projection adjustment device 200 causes every measuring projection device to perform, in order, an operation of projecting measurement light and having the other measuring projection devices shoot its image and judges a projection range connection relationship of the measuring projection device concerned. The measuring steps that each measuring projection device projects measurement light and all the measuring projection devices perform capture of image may be executed either only upon reception of a user manipulation instruction to perform a measurement or every prescribed time automatically.

If the count i becomes equal to the number of measuring projection devices (S17: no), the projection adjustment device 200 generates projection position information indicating a connection relationship between the projection ranges of the respective measuring projection devices. In this example process, as an example, the projection adjustment device 200 generates a graphical display picture indicating a connection relationship between the projection ranges (S18). Then the projection adjustment device 200 draws the graph in the manipulation picture displayed on the display unit 240 and thereby displays, graphically, the connection relationship between the projection ranges of the respective measuring projection devices (S19).

If the user makes a manipulation instruction to assign projection timings automatically, the projection adjustment device 200 calculates distances between the projection ranges of the respective measuring projection devices on the basis of projection position information such as the graph generated above and sets a start point measuring projection device (S21). A master measuring projection device may be set as a start point measuring projection device. Subsequently, the projection adjustment device 200 traces connected measuring projection devices in order starting from the start point measuring projection device and assigns, recursively, the measuring projection devices slot numbers indicating order of projection timings (each slot number is assigned to measuring projection devices whose projection ranges do not overlap with each other) (S22). The slot numbers correspond to above-mentioned phases of projection periods. If the above-described measurement steps S13 to S17 had not completed yet when the user made an automatic assignment manipulation instruction, the steps of assigning projection timings to the respective measuring projection devices may be executed after execution of the measurement steps.

Since as described above a connection relationship between the projection ranges of the respective measuring projection devices is judged and projection position information indicating the connection relationship is generated and displayed, the user can easily recognize a positional relationship between the projection ranges of the plurality of measuring projection devices. Seeing an image display in which the individual projection ranges are indicated by figures or the like, a graphical display in which a connection relationship such as overlaps between projection ranges is indicated by, for example, nodes and connection lines, the user can recognize a positional relationship between the plurality of projection ranges at a glance: display of projection position information that is high in visibility can be provided. This makes it possible to effectively assist projection operation adjusting work in which the user adjusts, for example, the projection ranges and/or projection timings of the respective measuring projection devices.

Furthermore, since a start point measuring projection device is determined and projection timings are assigned in order from the start point measuring projection device, projection timings such as proper projection order and phases can be set according to an arrangement of projection ranges while interference between measurement light beams of the plurality of measuring projection devices is prevented. An optimum measuring projection device that enables an efficient adjustment can be set as a measuring projection device to serve as a start point of measurement light projection.

Various example modes of display of projection position information by the projection adjustment device 200 will be described below.

Figure 21A:
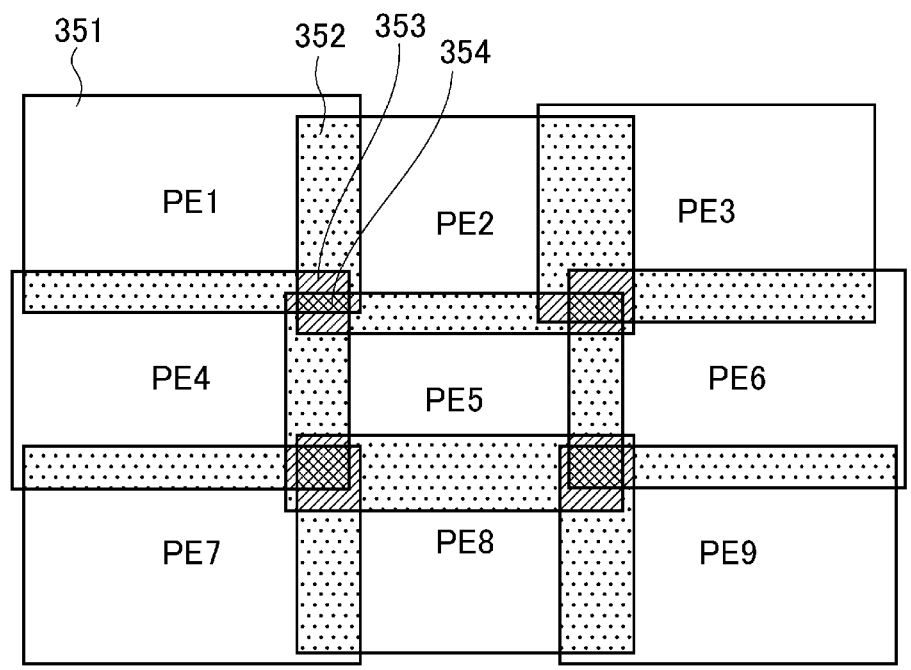
FIG. 21A is a diagram showing a first example image display of projection ranges of a plurality of measuring projection devices in a projection adjustment device according to the embodiment.
Figure 21B:
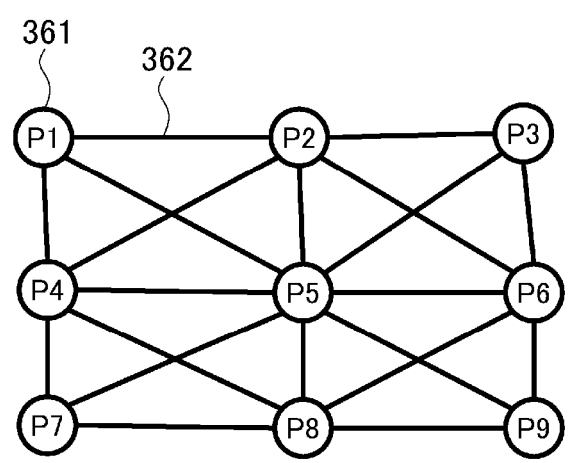
FIG. 21B is a diagram showing a first example graphical display of the projection ranges of the plurality of measuring projection devices in the projection adjustment device according to the embodiment.

FIG. 21A is a diagram showing a first example image display of projection ranges of a plurality of measuring projection devices in a projection adjustment device according to the embodiment. FIG. 21B is a diagram showing a first example graphical display of the projection ranges of the plurality of measuring projection devices in the projection adjustment device according to the embodiment. The first example displays of projection position information are example displays of projection position information by the projection adjustment device 200.

To display projection position information in a manipulation picture of the display unit 240, the projection adjustment device 200 performs image display of projection ranges of a plurality of measuring projection devices shown in FIG. 21A or graphical display of the projection ranges of the plurality of measuring projection devices shown in FIG. 21B. In the image display shown in FIG. 21A, in the case where nine measuring projection devices P1 to P9 are provided as a plurality of measuring projection devices 100, projection ranges PE1 to PE9 of the respective measuring projection devices P1 to P9 are represented schematically by rectangular figures, respectively. Seeing this image display, the user can visually recognize an arrangement of and a connection relationship between the projection ranges PE1 to PE9 easily. Whereas projection ranges 351 of the respective measuring projection devices are displayed, double projection ranges 352 each of which is an overlap of two projection ranges, triple projection ranges 353 each of which is an overlap of three projection ranges, quadruple projection ranges 354 each of which is an overlap of four projection ranges, etc. may be displayed in an emphasized manner by discriminating them using different colors, patterns, or the like. In this manner, the user is allowed to easily recognize overlaps between projection ranges and manners of overlap by seeing an image display.

The graphical display shown in FIG. 21B is a graph in which positions of the projection ranges of the respective measuring projection devices P1 to P9 are displayed in the form of nodes 361 such as circular marks and nodes 361 representing projection ranges that overlap with (i.e., are connected to) each other are connected to each other by a connection line 362. Seeing this graphical display, the user can recognize, at a glance, a connection relationship between the projection ranges of the respective measuring projection devices. Phases T1 to T4 indicating measurement light projection timings of the respective measuring projection devices P1 to P9 may also be displayed. Where a master measuring projection device is set, it may be displayed so as to be discriminated by a color, pattern, mark, or the like. Although the graphical display of FIG. 21B is of a non-directional graph in which the connection lines 362 have no direction, a directional graph may be employed in which the connection lines 362 are given arrows or the like indicating interference directions in the case where interference between measurement light beams is only in one direction. A directional graph may be employed in, for example, a case that target objects have complicated shapes and a first measuring projection device interferes with a second measuring projection device but the second measuring projection device does not interfere with the first measuring projection device (i.e., in the opposite direction).

Specific examples of how to set a start point measuring projection device among a plurality of measuring projection devices and how to assign projection timings to the respective measuring projection devices automatically will be described using the example displays of FIGS. 21A and 21B. The projection adjustment device 200 generates the graphic display of FIG. 21B from the image display of FIG. 21A. Among the nodes 361 of the respective measuring projection devices, two adjacent nodes (measuring projection devices) whose projection ranges overlap with each other are connected to each other by a connection line 362. The projection adjustment device 200 measures distances between each node (measuring projection device) and the other nodes, extracts a node whose distance from a farthest node is shortest, that is, a node whose number of steps taken to reach every other nodes is smallest, and makes this node a start point measuring projection device. As for distances between a plurality of nodes, a shortest route can be calculated by Dijkstra's algorithm or the like. A start point measuring projection device may be set as a master measuring projection device. In the illustrated example, the central measuring projection device P5 is set as a start point measuring projection device because it can reach every other node (measuring projection device) by one step. Then the projection adjustment device 200 assigns, in order, recursively, the nodes slot numbers indicating order of projection timings starting from the start point measuring projection device P5 (each slot number is assigned to nodes whose projection ranges do not overlap with each other). In the illustrate example, a first phase T1 is assigned to the measuring projection device P5, a second phase T2 is assigned to the measuring projection devices P4 and P6, a third phase T3 is assigned to the measuring projection devices P2 and P8, and a fourth phase T4 is assigned to the measuring projection devices P1, P3, P7, and P9.

The projection adjustment device 200 performs the above-described processing of measuring projection ranges of the plurality of respective measuring projection devices in real time and updates the image display or the graphic display of projection position information according to a current arrangement of the measuring projection devices. By performing this processing, the projection adjustment device 200 assists projection operation adjusting work in which the user adjusts, for example, the projection ranges of the respective measuring projection devices and/or the projection timing manually.

Figure 22A:
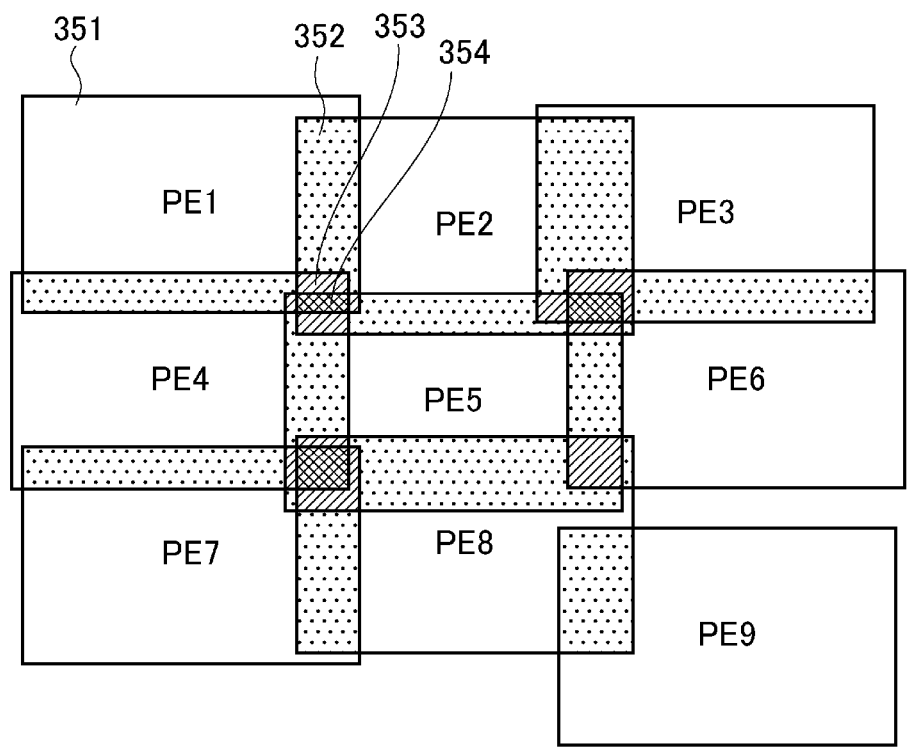
FIG. 22A is a diagram showing a second example image display of projection ranges of a plurality of measuring projection devices in the projection adjustment device according to the embodiment.
Figure 22B:
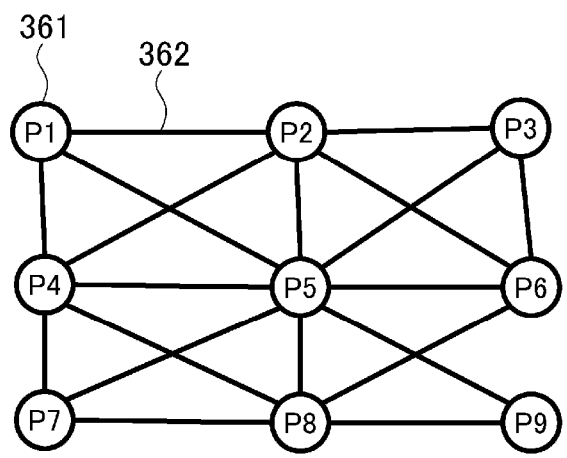
FIG. 22B is a diagram showing a second example graphical display of the projection ranges of the plurality of measuring projection devices in the projection adjustment device according to the embodiment.

FIG. 22A is a diagram showing a second example image display of projection ranges of a plurality of measuring projection devices in the projection adjustment device according to the embodiment. FIG. 22B is a diagram showing a second example graphical display of the projection ranges of the plurality of measuring projection devices in the projection adjustment device according to the embodiment. The second example displays of projection position information are example displays of a case that the projection ranges of part of the measuring projection devices are changed from the state of the first example shown in FIGS. 21A and 21B.

As shown in the image display of FIG. 22A, assume that the projection range PE9 of the measuring projection device P9 which is located at the bottom-right position in the figure is displaced downward and, as a result, comes not to overlap with the projection range PE6 of the measuring projection device P6. In this case, in the graphic display shown in FIG. 22B, no connection line is displayed between the node of the measuring projection device P9 and the node of the measuring projection device P6, whereby the user can recognize that no interference occurs and no connection relationship exists between the measuring projection devices P6 and P9. Seeing the image display shown in FIG. 22A, the user can recognize that a non-continuous region exists between the projection ranges PE6 and PE9. While seeing the display of the projection position information displayed by the projection adjustment device 200, the user can recognize the arrangement of the projection ranges of the respective measuring projection devices and adjust the projection ranges so as to obtain a proper arrangement. It is also possible for the user to set or adjust order, phases, projection timings, etc. of projection operations of the plurality of measuring projection devices on the basis of a display of projection position information.

Figure 23A:
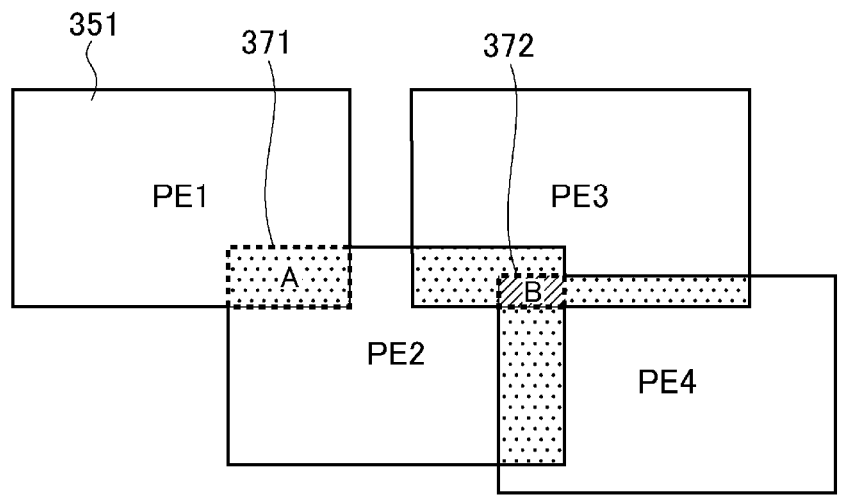
FIG. 23A is a diagram showing a third example image display of projection ranges of a plurality of measuring projection devices in the projection adjustment device according to the embodiment.
Figure 23B:
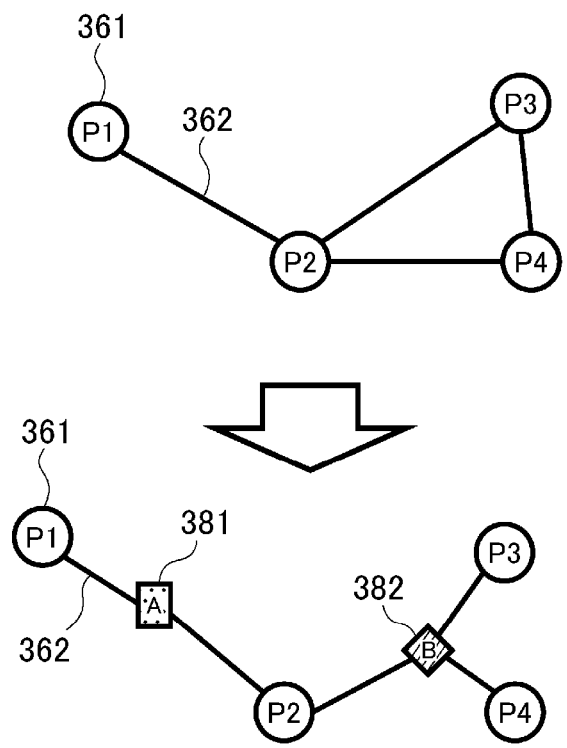
FIG. 23B is a diagram showing a third example graphical display of the projection ranges of the plurality of measuring projection devices in the projection adjustment device according to the embodiment.

FIG. 23A is a diagram showing a third example image display of projection ranges of a plurality of measuring projection devices in the projection adjustment device according to the embodiment. FIG. 23B is a diagram showing a third example graphical display of the projection ranges of the plurality of measuring projection devices in the projection adjustment device according to the embodiment. The third example displays of projection position information are example displays of projection position information displayed by the projection adjustment device 200.

To display projection position information in a manipulation picture of the display unit 240, the projection adjustment device 200 performs image display of projection ranges of a plurality of measuring projection devices shown in FIG. 23A or graphical display of the projection ranges of the plurality of measuring projection devices shown in FIG. 23B. In the image display shown in FIG. 23A, in the case where four measuring projection devices P1 to P4 are provided as a plurality of measuring projection devices 100, projection ranges PE1 to PE4 are represented schematically by rectangular figures, respectively. In this example, a double projection range 371 (region A) which is an overlap of two projection ranges and a triple projection range 372 (region B) which is an overlap of three projection ranges are displayed in an emphasized manner by discriminating them using different colors, patterns, or the like.

In the graphical display shown in FIG. 23B, positions of the projection ranges of the respective measuring projection devices P1 to P4 are displayed in the form of nodes 361 such as circular marks and nodes 361 representing projection ranges that overlap with (i.e., are connected to) each other are connected to each other by a connection line 362 and overlaps are displayed in an emphasized manner in the form of a plurality of kinds of nodes so that the overlapping states of projection ranges can be recognized in a more understandable manner. In the illustrated example, a region A is represented by an overlap node 381 (double projection range) and a region B is represented by an overlap node 382 (triple projection range). The degrees of overlapping, the sizes of overlap regions, etc. of the overlap nodes 381 and 382 representing the respective overlaps are displayed so as to be discriminated from each other by colors, patterns, shapes, or the like.

Seeing an image display or a graphic display as described above, the user can easily recognize various kinds of states of projection ranges such as positions where projection ranges of respective measuring projection devices overlap with each other, the number of overlaps between projection ranges, and a positional relationship between measuring projection devices whose projection ranges overlap with each other. In particular, since overlaps are represented by nodes of a graphic display, the user can recognize the degrees of overlapping, overlapping relationships, etc. of projection ranges at a glance.

Figure 24:
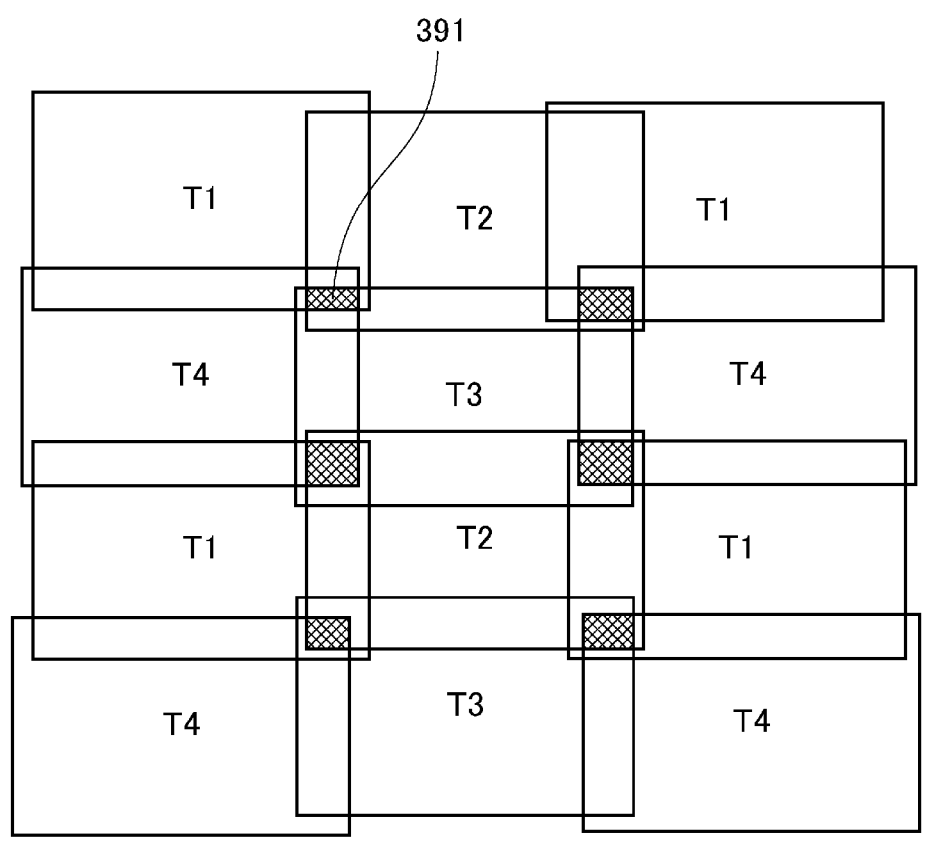
FIG. 24 is a diagram showing a fourth example image display of projection ranges of a plurality of measuring projection devices in the projection adjustment device according to the embodiment.
Figure 25:
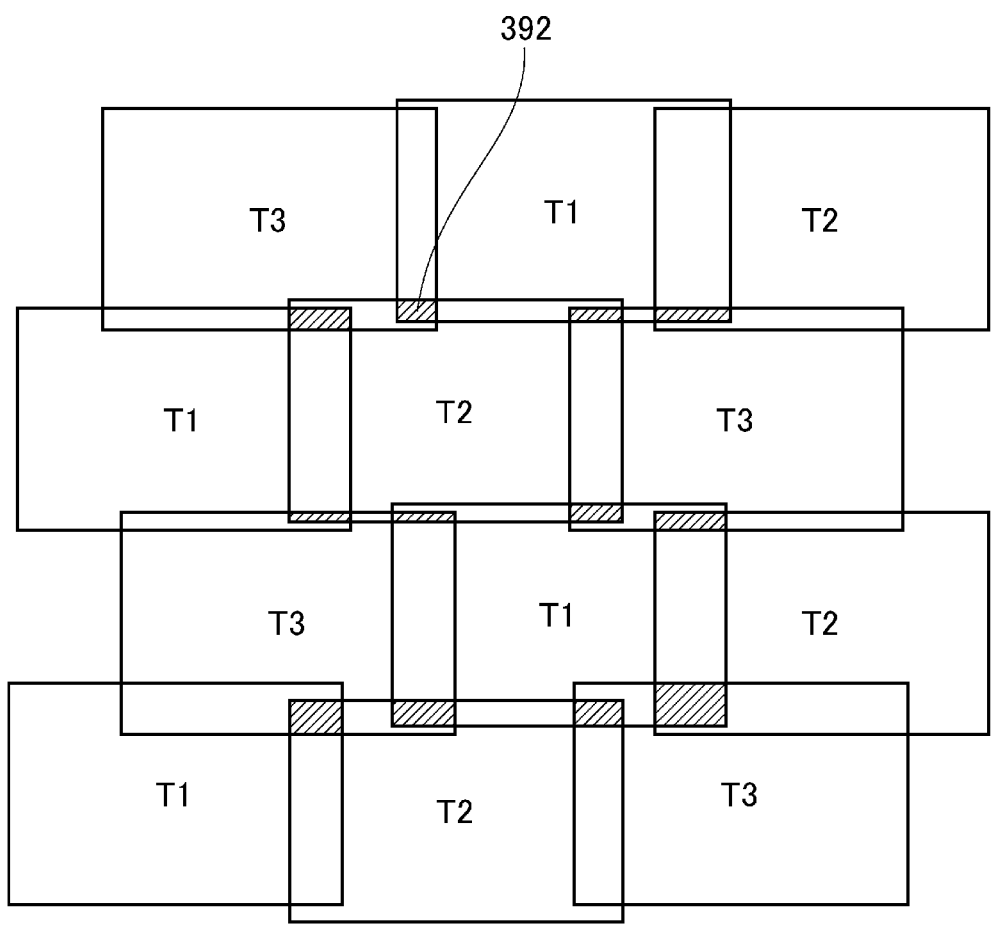
FIG. 25 is a diagram showing a fifth example image display of projection ranges of a plurality of measuring projection devices in the projection adjustment device according to the embodiment.

FIG. 24 is a diagram showing a fourth example image display of projection ranges of a plurality of measuring projection devices in the projection adjustment device according to the embodiment. FIG. 25 is a diagram showing a fifth example image display of projection ranges of a plurality of measuring projection devices in the projection adjustment device according to the embodiment. The fourth example image display and the fifth example image display of projection position information are example displays of projection position information for assisting projection operation adjusting work of the user.

To display projection position information in a manipulation picture of the display unit 240, the projection adjustment device 200 performs image display of projection ranges of a plurality of measuring projection devices shown in FIG. 24. In the illustrated example, the projection ranges of a plurality of measuring projection devices are represented schematically by rectangular figures, respectively, and phases T1 to T4 of projection timings of the respective measuring projection devices are shown.

Where rectangular projection ranges, having four sides in the outer circumference, of a plurality of measuring projection devices are adjacent to each other, the maximum number of overlaps is four and hence all the measuring projection devices can perform projection if four phases T1 to T4 are set as projection timings. Quadruple projection ranges 391 may be displayed so as to be discriminated from each other using different colors, patterns, or the like so that the user can recognize the overlap regions between projection ranges and the number of overlaps visually.

Assume that the fifth example shown in FIG. 25 has been obtained by the user's adjusting and displacing the projection ranges of part of the measuring projection devices from the state of the forth example shown in FIG. 24. In this case, the maximum number of overlaps between projection ranges can be changed to three by shifting the projection ranges of six measuring projection devices (i.e., three second-stage (from the top) projection ranges and three fourth-stage projection ranges) in the left-right direction in the figure. In this case, projection by all the measuring projection devices is enabled by setting three phases T1 to T3 as projection timings. Triple projection ranges 392 may be displayed so as to be discriminated using different colors, patterns, or the like so that the user can recognize the overlap regions between projection ranges and the number of overlaps visually. Position measurement and video display can be performed efficiently by adjusting the projection ranges of the plurality of measuring projection devices in the above-described manner so that they can cover the entire area with the three phases.

The above-described image display can assist projection operation adjusting work so that the user can set proper projection ranges and projection timings. Incidentally, where a display of projection position information has quadruple projection ranges that necessitate 4-phase projection, it is possible to assist the user in setting an arrangement of projection ranges easily that enables a 3-phase projection operation by making a warning display for the quadruple projection ranges using conspicuous colors, marks, or the like. It is also possible to assist the user by calculating movement directions, movement distances, etc. in adjustment of positions of projection ranges.

As described above, the projection adjustment program according to the embodiment is a projection adjustment program that allows a computer to execute a process relating to adjustment of projection operations of a plurality of measuring projection devices 100 in a projection system including the plurality of measuring projection devices 100 as projection devices for performing position measurement and projection on target objects 105 and 106. For example, the projection adjustment program is run by the projection adjustment device 200 which is connected to the measuring projection devices 100 of the projection system. The program allows the process to cause a first projection device of the projection system to project invisible measurement light onto the target objects; cause a second projection device of the projection system to receive reflection light, reflected from the target objects, of the measurement light; and judges a connection relationship of a projection range of the first projection device on the basis of the received reflection light of the measurement light. Furthermore, the program allows the process to execute the connection relationship judging step on all processing target projection devices, and generates projection position information indicating a connection relationship between the projection ranges of the respective projection devices of the projection system and displays the generated projection position information on a display unit.

With this program, in arranging a plurality of projection devices, a user can easily recognize a positional relationship between a plurality of projection ranges such as presence/absence of overlap between projection ranges, overlapping relationships of the projection ranges, and the number of overlaps. Furthermore, it becomes possible to assist, effectively, projection operation adjusting work so that the user can set proper projection ranges and projection timings.

The projection adjustment program allows the process to generate an image display representing the projection ranges of the measuring projection devices as a display of the projection position information. With this measure, the user can easily recognize a positional relationship between a plurality of projection ranges such as an arrangement of the projection ranges of the plurality of measuring projection devices and overlapping relationships between projection ranges by an image display such as a display of figures representing the respective projection ranges.

The projection adjustment program allows the process to generate a graphical display including nodes indicating positions of the projection ranges of the measuring projection devices, respectively, and connection lines indicating a connection relationship between the nodes that reflects overlaps between the projection ranges, as a display of the projection position information. With this measure, the nodes of the graphical display allow the user to recognize an arrangement of the projection ranges of the plurality of respective measuring projection devices and the connection lines allow the user to easily recognize a connection relationship between the projection ranges (i.e., overlapping states).

If the projection ranges of a plurality of measuring projection devices have an overlap, the projection adjustment program allows the process to display the overlap in an emphasized manner. With this measure, the user can recognize an overlap between projection ranges easily at a glance and hence can recognize a connection relationship between the projection ranges easily.

If the projection ranges of a plurality of projection devices have an overlap, the projection adjustment program allows the process to display an overlap node indicating an overlapping state of the projection ranges at the overlap. With this measure, the user can recognize overlaps between projection ranges and overlapping states such as the degrees of overlapping easily at a glance and hence can recognize a connection relationship between the projection ranges easily.

The projection adjustment program further allows the process to calculate distances between the projection ranges of the respective projection devices on the basis of the projection position information indicating the connection relationship between the projection ranges; and to set, as a start point projection device, a projection device having a shortest distance to the other projection devices. With this measure, an optimum measuring projection device that provides highest efficiency can be set on the basis of an arrangement of the projection ranges of the respective measuring projection devices as a measuring projection device to serve as a start point of measurement light projection such as a master measuring projection device.

The projection adjustment program allows the process to assign projection timings to the measuring projection devices in order recursively starting from the start point projection device, each projection timing being assigned to measuring projection devices whose projection ranges do not overlap with each other. With this measure, proper projection timings such as projection order and phases that are suitable for an arrangement of the projection ranges can be set while interference between measurement light beams of the plurality of measuring projection devices is prevented.

The projection adjustment method according to the embodiment is a projection adjustment method of the projection adjustment device 200 which executes a process relating to adjustment of projection operations of a plurality of projection devices 100 as projection devices that perform position measurement and projection on target objects 105 and 106 in a projection system including the plurality of projection devices 100. The projection adjustment method causes a first projection device of the projection system to project invisible measurement light onto the target objects; causes a second projection device of the projection system to receive reflection light, reflected from the target object, of the measurement light; and judges a connection relationship of a projection range of the first projection device on the basis of the received reflection light of the measurement light. Furthermore, the projection adjustment method executes the connection relationship judging step on all processing target projection devices; and generates projection position information indicating a connection relationship between the projection ranges of the respective projection devices of the projection system and displays the generated projection position information on a display unit. This projection adjustment method allows the user to easily recognize a positional relationship between a plurality of projection ranges in arranging a plurality of projection devices.

Although the various embodiments have been described above with reference to the drawings, it goes without saying that the invention is not limited to those examples. It is apparent that those skilled in the art could conceive various changes or modifications within the confines of the claims, and they are naturally construed as being included in the technical scope of the invention. Constituent elements of the above-described embodiments may be combined in a desired manner without departing from the spirit and scope of the invention.

The present application is based on Japanese Patent Application No. 2018-095728 filed on May 17, 2018, the disclosure of which is invoked herein by reference.

INDUSTRIAL APPLICABILITY

The present disclosure is useful in providing a projection adjustment program and a projection adjustment method which allow, in arranging a plurality of projection devices, a user to easily recognize a positional relationship between a plurality of projection ranges.

DESCRIPTION OF REFERENCE SIGNS 100, 100A, 100B, 140, 160A, 160B: Measuring projection device
101: Image capture device
102: Infrared light projection device
103: Computing device
104: Visible light projection device
105: First target object
106: Second target object
111: Lens optical system
112: Infrared LED light source
113: Display device
131: Setting input unit
142: Projection device
150: Timing control unit
151: Timing generator
152: External synchronization interface (I/F)
153: Optical sensor
200: Projection adjustment device
210: Processing unit
220: Storage unit
221: Projection adjustment program
230: Communication interface (I/F)
240: Display unit
250: Monitor
260: Input unit
401: Image input unit
402: Pattern decoding unit
405: Coordinates conversion unit
407: Coordinates interpolation unit
408: Content generation unit
410: Image output unit
411: Pattern generation unit

What is claimed is:

1. A non-transitory computer-readable storage medium that stores a projection adjustment program, the projection adjustment program, when executed by a processor, causing a computer to execute a process relating to adjustment of projection operations of a plurality of projection devices, the plurality of projection devices configured to perform position measurement and projection on a target object in a projection system, the projection system comprising the plurality of projection devices, the process comprising:
   causing a projection device of the projection system to project measurement light onto the target object;
   causing an image capture device of the projection system to receive reflection light of the measurement light, the reflection light being reflected from the target object;
   judging a connection relationship of a projection range of the projection device on a basis of the received reflection light of the measurement light;
   executing a process of the judging of the connection relationship on all processing target projection devices; and
   generating projection position information indicating a connection relationship between projection ranges of the respective plurality of projection devices of the projection system and displaying the projection position information on a display,
   wherein the projection position information comprises representative figures of the projection ranges of the plurality of projection devices.

2. The non-transitory computer-readable storage medium according to claim 1,
   wherein, when the representative figures of the projection ranges of the plurality of projection devices have an overlap, the overlap is displayed in an emphasized manner.

3. A projection adjustment method of a projection adjustment device, the projection adjustment device configured to execute a process relating to adjustment of projection operations of a plurality of projection devices, the plurality of projection devices configured to perform position measurement and projection on a target object in a projection system, the projection system comprising the plurality of projection devices, the projection adjustment method comprising:
   causing a projection device of the projection system to project measurement light onto the target object,
   causing an image capture device of the projection system to receive reflection light, reflected from the target object, of the measurement light;
   judging a connection relationship of a projection range of the projection device on a basis of the received reflection light of the measurement light;
   executing a process of the judging of the connection relationship on all processing target projection devices; and
   generating projection position information indicating a connection relationship between the projection ranges of the respective plurality of projection devices of the projection system and displaying the generated projection position information on a display,
   wherein the projection position information comprises representative figures of the projection ranges of the plurality of projection devices.

4. A projection system, comprising:
   a plurality of projection devices configured to perform position measurement and projection on a target object; and
   a projection adjustment device including a memory, the memory storing a projection adjustment program, the projection adjustment program, when executed by the projection adjustment device, causing the projection adjustment device to execute a process, the process relating to adjustment of projection operations of the plurality of projection devices, the process including:
   causing a projection device of the projection system to project measurement light onto the target object;
   causing an image capture device of the projection system to receive reflection light of the measurement light, the reflection light being reflected from the target object;
   judging a connection relationship of a projection range of the projection device on a basis of the received reflection light of the measurement light;
   executing a process of the judging of the connection relationship on all processing target projection devices; and
   generating projection position information indicating a connection relationship between projection ranges of the respective plurality of projection devices of the projection system and displaying the projection position information on a display,
   wherein the projection position information comprises representative figures of the projection ranges of the plurality of projection devices.

\* \* \* \* \*